United States Patent [19]

Barker, III

[11] Patent Number: 5,420,965

[45] Date of Patent: May 30, 1995

[54] SINGLE PASS METHOD OF COMPRESSING DATA TRANSMITTED TO COMMAND DRIVEN TERMINAL

[75] Inventor: W. Daniel Barker, III, Atlanta, Ga.

[73] Assignee: Software Projects, Inc., Atlanta, Ga.

[21] Appl. No.: 893,724

[22] Filed: Jun. 5, 1992

[51] Int. Cl.⁶ .......................................... G06F 15/00
[52] U.S. Cl. .................................... 385/114; 395/101; 358/296
[58] Field of Search ................ 395/114, 112, 101, 102, 395/115; 358/296; 400/122; 364/514, 200, 900

[56] References Cited

U.S. PATENT DOCUMENTS

| | | | |
|---|---|---|---|
| 4,587,633 | 5/1986 | Wang et al. | 364/900 |
| 4,620,289 | 10/1986 | Chauvel | 364/521 |
| 4,750,137 | 6/1988 | Harper et al. | 364/514 |
| 4,805,135 | 2/1989 | Ochi et al. | 364/900 |
| 4,928,234 | 5/1990 | Kitamura et al. | 364/200 |
| 4,942,390 | 7/1990 | Do et al. | 395/114 |
| 5,129,061 | 7/1992 | Wang et al. | 395/200 |
| 5,185,853 | 2/1993 | Cheng et al. | 395/115 |
| 5,191,430 | 3/1993 | Sudoh et al. | 358/296 |
| 5,195,174 | 3/1993 | Kagawa | 395/102 |
| 5,207,517 | 5/1993 | Ito | 400/121 |
| 5,208,676 | 5/1993 | Inui | 358/296 |
| 5,222,200 | 6/1993 | Callister et al. | 395/112 |

FOREIGN PATENT DOCUMENTS 59-89056  5/1984  Japan .......................... H04L 11/00

*Primary Examiner*—Mark R. Powell
*Assistant Examiner*—Steven P. Sax
*Attorney, Agent, or Firm*—Jones & Askew

[57] ABSTRACT

A process for compressing data sent to command driven remote video terminals is disclosed. A command string representation of the current contents of the remote terminal's video buffer is maintained locally at the host computer. This command string representation is a sequence of commands, in the terminals command language, that will write the contents of the screen in a manner as expected by the application that originated the transmitted data, if the sequence were sent to the terminal device following an erase/write command. Incoming current command strings are sorted by buffer address order and analyzed and merged with the command string representation of the buffer contents via a very efficient single pass process that provides a new expected state representation, an erase/write command string, and a write command string which expresses only the differences between the current terminal buffer contents and the desired presentation. The shorter of the erase/write or write command strings is then physically sent over the data link to the remote terminal and the new expected state representation becomes the command string representation. Additionally, a method of representing and implementing an algorithmic state machine is shown in which the state table itself is the compilable code. Each state name is a valid label. At each label, the same multi-argument function is called, which takes a test, a procedure, and at least one branching destinations expressed as other state labels as arguments.

11 Claims, 8 Drawing Sheets

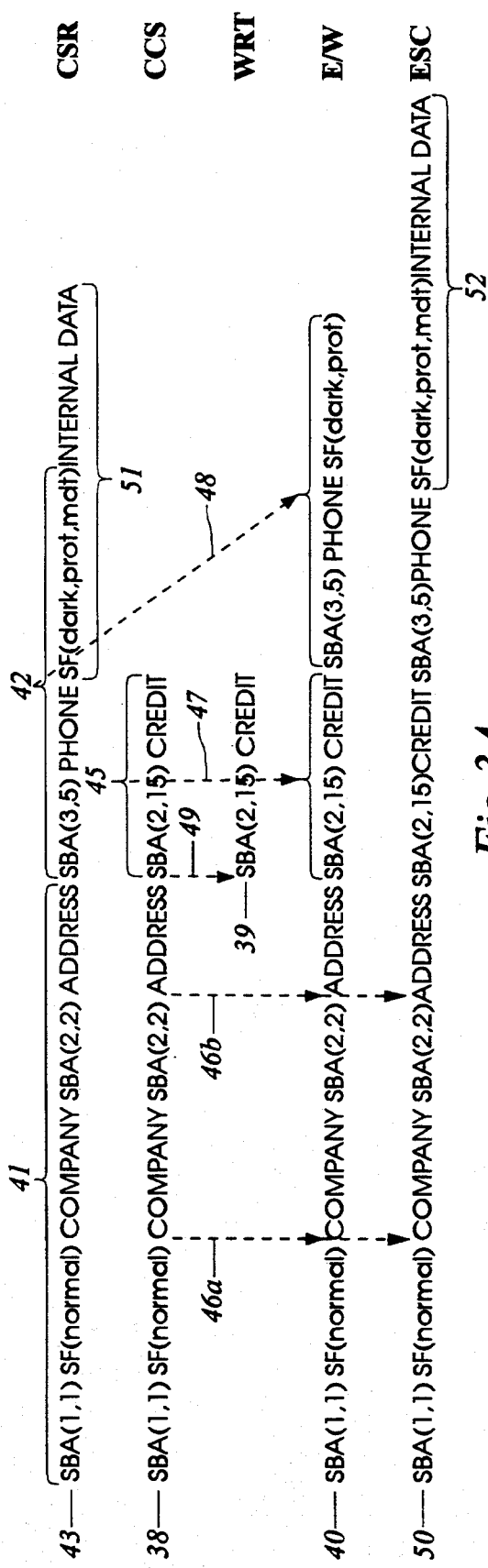
Fig 3A.
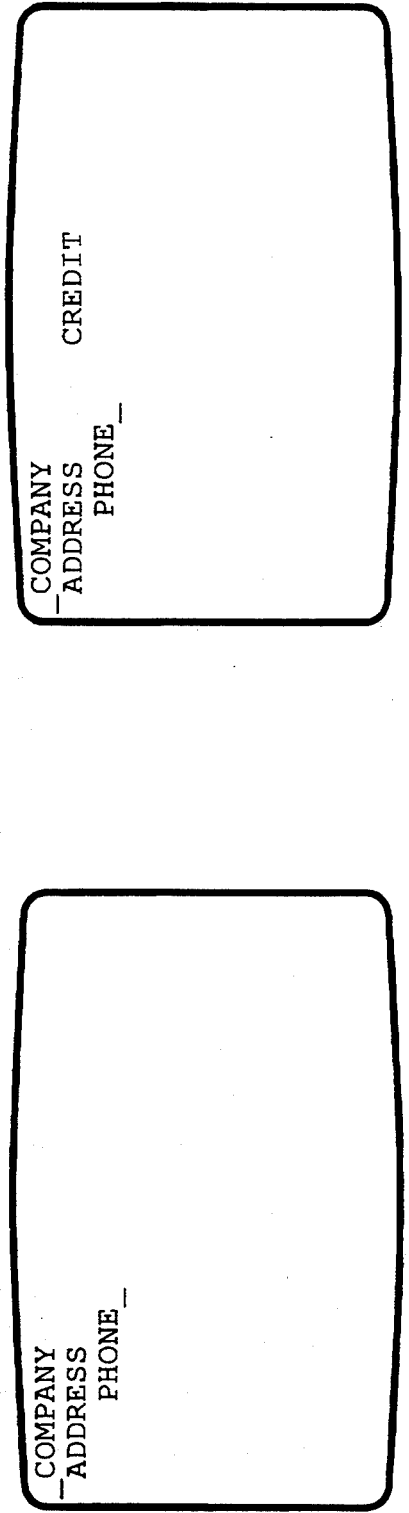
Fig 3B.
Fig 3C.

SINGLE PASS METHOD OF COMPRESSING DATA TRANSMITTED TO COMMAND DRIVEN TERMINAL

TECHNICAL FIELD

The present invention is in the field of data compression in data communications and in particular is an improved method of compressing particular types of data transmitted between a host computer and one or more remotely located command driven terminals.

BACKGROUND OF THE INVENTION

There is, in both the United States and other developed countries throughout the world, a very large installed base of computer systems running a particular type of video terminal and monitor software. One of the best known examples of same is the IBM 3270 family of terminals. Such terminals include a keyboard, CRT display, and an addressable screen buffer memory for holding the contents of the CRT display. These terminals are normally used with main frame computers running a software package sold under the trademark VTAM, which is an acronym for Virtual Telecommunications Access Method. The VTAM software package was created and is sold by International Business Machines Corporation ("IBM") of White Plains, N.Y. The operating characteristics and interfaces to the VTAM software are well known to those skilled in the art and are well documented in published IBM literature. The VTAM software package includes facilities for a computer program to interface between a physical CRT and the connected application program being run by a host computer. This is commonly implemented by a physical connection of an IBM type 3274 terminal control unit connected to a plurality of dumb terminals, which physically include only the keyboard and the CRT. Irrespective of the specific physical configuration, the present invention is usable with any apparatus that includes a host computer that is connected to a command driven terminal device having an addressable screen buffer memory.

These terminal devices are configured to provide bidirectional communication with a host computer to which they are connected, either directly, or via intervening modem/telephone line combinations or other links. In particular, communications are effected by writing into and reading from the contents of the addressable screen buffer.

Like most CRT terminals with memory, the screen buffer includes addressable locations for character contents and attribute data, which controls certain aspects of the visual presentation of data at associated screen locations, such as highlighted video, reverse video, blinking, etc.

The original 3270 terminals had their origin many hardware generations ago. A simple command language for controlling the writing of data into the screen buffers was created and is part of the operating systems with which these devices are normally used. In particular, the command set includes commands to erase the buffer before writing, erase the buffer and set the alternate screen size before writing, and to write without a preceding erase. The data to be written can contain buffer control orders which include Set Buffer Address (SBA), i.e., to position to a particular address in the screen buffer at which the data orders will be place. Additional orders include ones to insert the cursor (IC), a Start Field (SF) or Start Field Extended (SFE) command to define the beginning and end of a field on the screen and the display attributes of the character or entry areas following, and to erase any existing unprotected data (EUA) up to a specified address. Data is protected or unprotected based on the attribute in the Start Field order preceding the data position.

It should therefore be understood that the contents of the screen buffer can be modified by either erasing the entire contents with an erase command followed by order to write to all locations at which the user wants data displayed, or alternatively a write command may be sent with orders to simply overwrite portions of the screen buffer leaving other portions unchanged. Both techniques are commonly used in application programs written to run on machines connected to such terminals.

Normally, only modified fields are transmitted back from the terminal device, i.e., fields in which the terminal operator added, changed, or deleted characters. These altered fields are transmitted back to the host computer preceded by the screen buffer address which the field begins. Some applications need the field data to be transmitted whether it has been modified or not. This is accomplished by having the application set the Modified Data Tag (MDT) in the attribute in the Start Field order. Those familiar with the 3270 family of terminals know that the Modified Data Tag for these particular devices is the lowest order bit in the attribute character of the Start Field order. The terminal controller sets this bit when the data is modified by the terminal operator and, as noted above, the application can also set it in order to cause the terminal controller to return the contents of the field irrespective of actions at the terminal.

Data representing the contents of fields with set Modified Data Tags are returned upon the operation of one of a plurality of interrupt keys, the most common of which is the carriage return or ENTER key. In this way, bidirectional communications are effected based on location in the screen buffer, and thus, the location of data on the screen itself.

As the sophistication of computer systems has increased and user's desire for larger terminals with greater data display capabilities have increased, larger terminals have been introduced into the 3270 family. These devices have larger screen buffers in order to accommodate more screen data and to provide a greater variety of display attributes.

The size of the screen buffers generally varies from 480 display positions on a 3270 Model 1 to 9,920 positions on a 3290 display station, one of the more sophisticated terminals of this particular family.

As large computer systems, such as airline reservation computers and the like have become more common, there are an increasing number of remotely located terminals connected to the computers via telephone links. As the size of the screen buffers is increased, it will be appreciated that significant amounts of time are required to transmit large blocks of data from a host computer running a particular application to a remote terminal device. For example, if a 9600 bit per second modem is used on a voice grade telephone line, it takes a period on the order of 25 to 30 seconds to transmit the entire contents of a 3290 screen buffer from the host to the terminal. Transmission of high volumes of data between a host computer and a terminal has the doubly undesirable effect of increasing costs for running the system by using a large amount of telephone line capacity as well as increasing the delay that users experience in interactive operations with the host.

The phenomenon of increased cost and user irritation from system slowdown has led to a number of schemes for compressing data transmitted between command driven remote terminals and host computers. Such data compression schemes are designed to reduce the volume of data transmitted back and forth between the host computer and the terminal. The fundamental common characteristic of such schemes is that some form of information concerning the present state of each terminal connected to the system is maintained locally at the host computer. A program implementing the data compression examines the information about the current state of the screen, at least as it is indicated by the information at the host, and examines outbound command strings. From analysis of these two, the programs effecting the data compression reduce the amount of data actually transmitted to the terminal in order to achieve the same resultant display.

For example, some schemes for data compression over links between a host computer and a command driven terminal maintain an indication of which particular fields on the terminal are modified by a command string sent by an application program and will transmit only instructions to overwrite the modified fields. Any redundant commands that write unchanged data to other fields are stripped out. Depending on the application that is running on the host and its activity with respect to redefining fields, this can be a useful to approach to reducing the overall amount of data transmitted from host to terminal. This is particularly true if the programmer of the application was inattentive to opportunities to avoid the transmission of redundant data for unchanged fields. Indeed, one of the main reasons that the need and market exists for data compressors of this type is the fact that there are many large computer installations with relatively old applications running where less than optimum techniques were employed by the programmers in writing the code that transmits output to remote terminals.

Additionally, modem programming languages and application generators typically insulate the programmer from the hardware requirements. In some cases, it is not possible for the programmer to direct efficient use of the terminal display in the chosen language. Also, many languages support the use of multiple terminal types independent of the application program logic. Only after the type of terminal is established in a session with the host are the true physical limitations of the display buffer known. In these cases, efficient use of the terminal buffer and telecommunications lines may not be enforced by the programmer but must be driven by the terminal processor or a compression program such as the invention described in this specification.

While transmitting only modified fields can be effective, if the fields are long and only minor modifications have been made, there is still a significant amount of redundant data transmitted.

U.S. Pat. No. 4,750,137 issued Jun. 7, 1988 to Harper et al. shows another method of compressing data that is transmitted to command driven terminals. The method disclosed in Harper creates two buffers sized identically to the terminal buffer for each terminal currently connected to the host system. One of these buffers is used to maintain a present state image of the buffer contents. In other words, this is a locally maintained duplication of what should be the contents of the screen buffer at a particular remote terminal. As the application running on the host outputs commands to write to the screen buffer, the compressor of the '137 patent does the following. It writes a copy of the present state image into the second buffer. It intercepts the outbound commands and data intended for the particular terminal, and performs the same operations on the second buffer that the terminal would had it received the data. When this process is finished, one of the duplicated buffers contains the present state image and the other buffer contains a representation of what should be the updated image of the screen buffer at the remote terminal.

These two buffers are then compared on a byte-by-byte basis, using an exclusive OR function, to determine the address locations in each buffer that contain different data. If the data is the same, the exclusive OR function will be false. If the data is different, the exclusive OR function for that particular byte location will be true and the compressor program knows that information concerning the state of this buffer location should be transmitted to the remote terminal. The program then assembles, in the terminal command language, a set of commands to write new data to the changed locations detected by the exclusive ORing process. Once this is accomplished, the modified screen image buffer becomes the present screen image buffer and the process is repeated the next time a command to write data to the screen is received from the host application.

The data compression program disclosed in Harper et al. '137 has the advantage of effectively minimizing the amount of data transmitted from the host application to the VTAMs. However, the price paid for this minimization is significant increases in both memory and CPU time overhead at the host in order to implement the compressor. For each session with a terminal having an address buffer of a given size that the host application can service at any given time, a portion of the host's memory that is more than twice the size of the terminal's buffer must be allocated. Additional memory beyond the buffer size containing order and attribute information must also be used. Furthermore, upon each burst of command strings from the host intended for a particular terminal, a number of exclusive OR operations equal to the size of the screen buffer must be made before each transmission of data is made to a remote terminal. For a numerical example, if a large host system is configured to handle 100 remote sessions supporting 3290 type terminals simultaneously, host memory on the order of 6 megabytes must be allocated just to support the data compression buffers. Also, while the Harper compression algorithm effectively minimizes transmitted data, it scans and compares a memory location corresponding to each screen buffer location, irrespective of how small the transmitted string received from the host happens to be. In other words, it is efficient with respect to data transmitted to the remote terminal, but inefficient with respect to the overhead required to service the algorithm locally at the host.

The process shown in the Harper et al. patent is algorithmically relatively simple but requires a great deal of CPU time and a significant amount of memory. To implement a single pass merger and analysis as is used in the present invention, conventional programming techniques require either the setting of a large number of flag variables to indicate present aspects of the relationship between the current state of the buffer indicated by the command string representation and the processing of the new commands. Alternately, if-then statements must be nested as deeply as the number of state variables necessary to define the current state of the method with respect to a large number of conditions. If any additional variables need to be added, the painful process of analyzing where in the nested statements the test for the new variables must be included is laborious, difficult, and prone to cause bugs in programming. Thus, the task of writing a program to implement a process such as that of the preferred embodiment of the present invention is quite complex using conventional programming techniques and leads to large object code segments.

Therefore, there is a need in the art of supporting data communications between command driven terminals and host computer systems for an improved method of compressing data transmitted to such terminals that, like the method disclosed in the Harper et al. '137 patent, effectively minimizes the length of the string transmitted to the remote terminal, but which also provides an advantage of significantly reducing both memory and computation time overhead at the host that is required to service the compression function.

SUMMARY OF THE PRESENT INVENTION

The present invention meets the above stated need. Broadly stated, the present invention is a method of compressing data transmitted to a command driven terminal device that maintains a current command string representation of the contents of each simultaneously supported screen buffer. The command string representation is a coded representation of the buffer contents expressed in the form of a string of commands in the terminal command language that would, if transmitted to the terminal subsequent to transmission of an erase command, duplicate the current contents of the buffer. The command string representation is maintained in a state that is in ascending buffer address order. In other words, the individual commands of the command string representation are maintained in a sequence such that those that cause writing to the lowest number address in the screen buffer appear first in the overall string that constitutes the command string representation.

Whenever a set of command strings is received from the application running on the host, this set of command strings is stored in a buffer and sorted in ascending buffer address order. Subsequently, the method employs the step of sequentially analyzing and merging both the newly received set of command strings and the existing command string representation of the present contents of the buffer.

In the preferred form of the present invention, three command strings are generated as a result of this analysis and merger. These strings are also referred to as the output objects of the preferred embodiment. The first is a write command string (WRT). This string is a sequence of commands, in the terminal command language combined with appropriate data, that would cause all new data to be written to the screen, but does not duplicate any redundant write commands that would simply overwrite screen buffer locations with the same data that they already contain. In other words, in generating the write command sequence, the analysis detects commands in the new set from the application that simply rewrite redundant data in to particular buffer address locations, and eliminates these commands, or the redundant portion of the data for the commands, from the resultant write command string.

The second result of the analysis is to generate an erase/write command string (E/W). This string is a sequence of commands, also in the terminal command language combined with appropriate data, that would cause all necessary data for the desired screen presentation to be written to the terminal following an erase command.

The third result of the analysis is to generate an expected state command string (ESC). The expected state command string is a string of commands, likewise in the terminal command language with appropriate data, that would write the new state of the screen buffer entirely, following transmission of an erase command.

Note that the visual presentation presented to the user at the terminal following an erase command is the same for the erase/write command string and the new expected state command string. However, the difference is that the erase/write command string contains only information that is necessary to visibly cause the identical screen to present itself to the user as would result from sending the entire new expected state string. The erase/write command string contains no modified data tag (MDT) settings, no trailing protected blanks and no dark protected data, as these are not necessary for the visual screen presentation. The application expects these constructs to be present in the terminal's screen buffer so the expected state command string contains information representative of all of the transmitted orders and data.

Once this is completed, the length of the write command string and the erase/write command string are compared and the shorter of the two is transmitted with the appropriate command, i.e., write, erase/write, or erase/write/alternate. This is because the transmission of either string will provide the same end result with respect to the visible images on the screen at the remote terminal being serviced. Irrespective of which string is sent, the above described expected state command string representation becomes the new command string representation for the current contents and is maintained in memory at the host for servicing this particular terminal until the next set of command strings is received from the host application.

Since the length of the command string representation for a screen buffer may vary considerably, both during execution of an application and from application to application, the preferred form of the present invention employs dynamic buffer allocation when supporting multiple simultaneous sessions. First, it should be noted that rarely will an application generate a command string representation of the current contents of a buffer that occupies a number of bytes that approximates the buffer size. This can only occur when a very complex screen is presented to the user having a large number of relatively short fields. Indeed, it will be intuitively apparent that a screen for which the length of the command string representation approached the length of the buffer would be one that would present an extremely cluttered appearance to the user. Therefore, good human interface practices in writing applications to run on the host drive host software in a direction that leads to small command string representation sizes as compared to the size of the screen buffer. Additionally, since there is no need to replicate large fixed size blocks of data as buffers, as is the case with the compression algorithm shown in the Harper et al. '137 patent, it is relatively easy and efficient to dynamically allocate available memory space for different sized buffers, depending on the recent history of the size of command string representations, that are used with particular sessions.

In addition to the specific application of the preferred embodiment of the present invention, there is an underlying more general invention described herein. The more general invention is a novel way of representing and implementing a complex state machine. In particular, the method of representing and implementing the state machine of the preferred embodiment comprises the steps of defining a plurality of states and designating each state as a label in a source language. Each label includes a particular executable procedure that takes a predetermined number of arguments M that is equal to N+2, where N is an integer greater than 1 and equal to the number of alternative conditions that can be taken by a branch on condition test used by the machine. In many instances, N will be equal to 2 wherein true and false are the conditions that a conditional branch statement can take. In the preferred embodiment of the present invention, there are three possible conditions for conditional branch: less than, equal, or greater than. Therefore, in the preferred embodiment, the particular procedure at each label takes five arguments.

One argument is a call to a label for a procedure to be performed while in the state identified by the state label. The second parameter is a call to a particular one of a plurality of tests that are performed on current conditions of program variables, or on the output from the procedure called by the previous argument. Next, N parameters are state labels for other states to which the state machine should branch on the N conditions that results from the test.

Thus, N of the parameters for each execution of the basic procedure are other state labels. Each state label is a valid label in the language being used to implement the machine.

One aspect of the best mode of the state machine implementation aspect of the present invention is that the procedure label is either a macro label or a call to a subroutine in the language that is used to encode the state machine. Therefore, shorter procedures are inline macros that are compiled directly by the compiler or assembler used to generate code to implement the machine. When procedure labels correspond to subroutines, the assembler will insert a call to the subroutine at the point where these procedure labels appear. Therefore, very compact code for implementing the state machine and executing the underlying process can be generated by a judicious choice of inline macros that are directly assembled or compiled into machine language statements when a macro label is encountered in the state machine representation, and longer procedures are identified by a label that references a subroutine call. The ability to directly compile short macros of code leads to a faster operating program that does not employ CPU overhead by placing parameters on a stack that is required when making a subroutine call. When complex procedures are called, subroutines are used as they are more appropriate in such circumstances.

Another way of viewing this aspect of the present invention is that construction of a state machine that implements an Niary tree can be directly implemented from a graphical representation of the tree where the state names for the nodes are the labels, and a single standard procedure calls another procedure and a test that identifies the branches of the tree. The procedure that is called is one that is appropriate to be performed at the node, depending on the state, and the test tests for branching to the next node along one of the available N paths. The net result of this is that a list of states can be created where the state table is effectively the code that is assembled or compiled by the assembler or compiler in use.

It is an object of the present invention to provide an improved method of compressing data provided to command driven terminals that effectively minimizes the amount of CPU time required to accomplish compression, the amount of data actually transmitted over a physical link to a remotely connected terminal, as well as significantly reducing the size of the memory that the host computer employing the method must allocate to buffers for implementing the compression function.

In particular, the reduction in the amount of transmitted data is comparable to that achieved by prior art methods having the highest compression ratios, but the CPU overhead for accomplishing this compression ratio is dramatically reduced by the single pass analysis and merger employed the present invention.

It is a further object of the present invention to provide an improved method of compression that will sort an incoming set of command strings from a host application and then, in a single pass, compare and merge that set of command strings with a command string representation of the current contents of a terminal's screen buffer.

It is still a further object of the present invention to provide such an improved method that will generate a new expected state command string representation as a result of the one pass analysis and both a write command and an erase/write representation of the differences between the current and new states of the buffer.

It is yet a further object of the present invention to provide an improved method of compressing data transmitted to command driven terminals that will send minimum length bursts of data to remote terminals yet, in practical applications, reduces the amount of buffer memory required at the host to about 30 percent of that required for the buffer duplication and exclusive ORing methods of the prior art.

That the present invention meets these objects, and overcomes the drawbacks of the prior art cited hereinabove, will be appreciated from the detailed description of the present invention hereinbelow.

BRIEF DESCRIPTION OF THE DRAWINGS

FIG. 3A is a diagram of a command string representation, a set of current command strings, and the three output objects produced by the preferred embodiment.

FIGS. 3B and 3C show screen outputs before and after processing of the set of current command strings that are shown on FIG. 3A.

DETAILED DESCRIPTION

Figure 1:
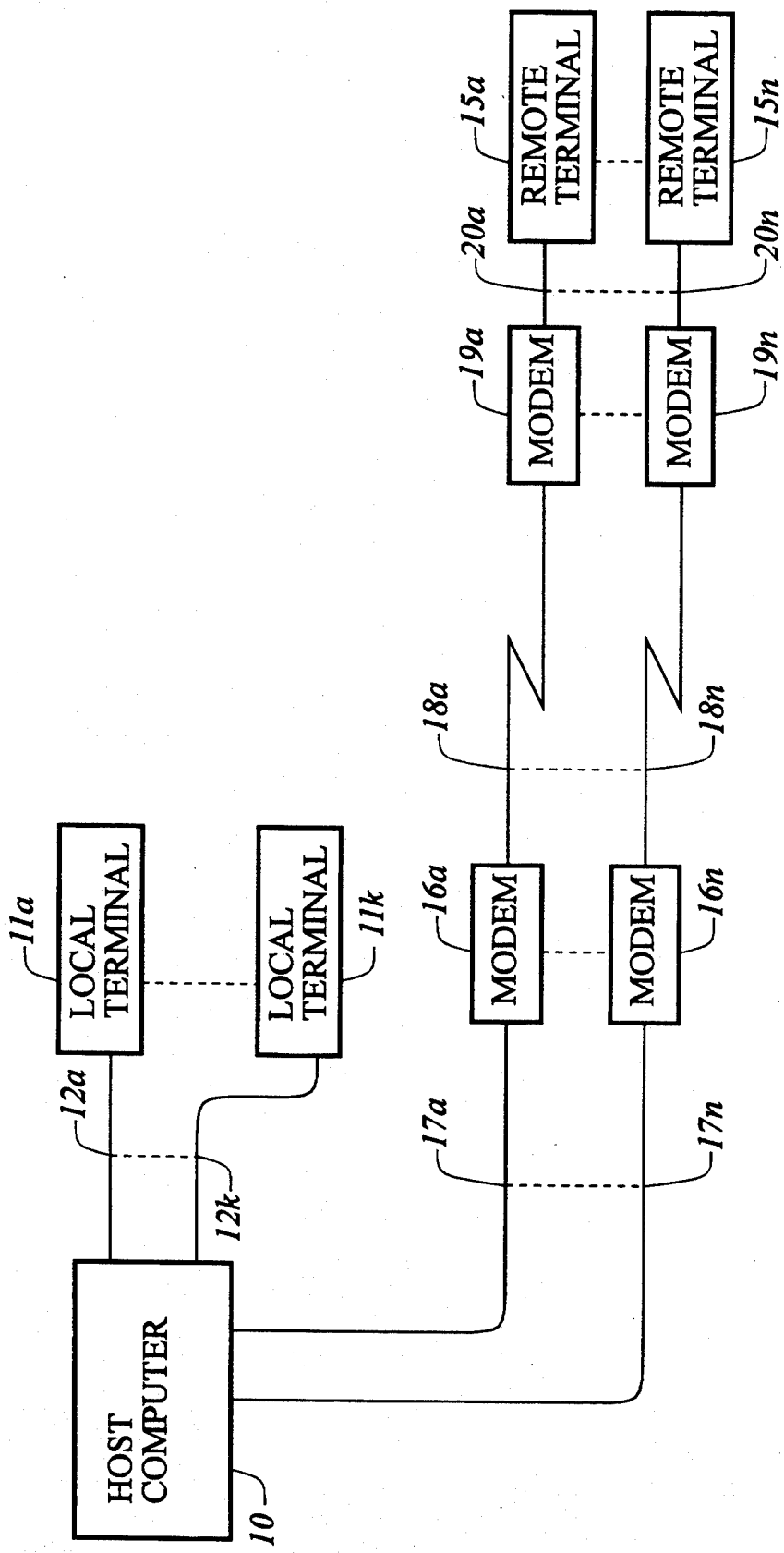
FIG. 1 is a block diagram of a host computer system with a plurality of local and remote video terminals, which system constitutes the normal environment in which the present invention is used.

Turning next to the drawing figures in which like numerals represent like parts and steps, the preferred embodiment of the present invention will now be described. The environment in which the present invention is most likely to be used is one in which a large main frame host computer 10 is operated communicating with a plurality of video terminals that include addressable screen buffers. In FIG. 1 a set of k locally connected terminals are represented by terminals 11a–11k. These are connected over bidirectional links 12a–12k. Also shown is attached to host computer 10 n remote terminals 15a–15n. While these may be connected over a wide variety of telecommunications facilities, they are represented by the most common connection configuration, i.e., connection via plurality of modems over the public switch telephone network, leased lines, or through commercial networks. A plurality of local modems 16 are connected to host computer 10 via serial links 17. Each of the local modems 16 is connected to a remote modem 19 via an intervening telecommunications link 18, which is of arbitrary length. Remote modems 19 are connected to remote terminals 15 via serial data links 20.

As noted hereinabove, the value of n often exceeds 100, and can be a very large number for complex systems such as airline reservation computers and the like. Principle purposes of the present invention are to reduce CPU overhead caused by use of compression, to reduce the amount of the memory of host computer 10 that needs to be allocated for an efficient data compression function for the communication between host computer 10 and remote terminals 15, and to reduce the amount of data that flows over data links 17, 18 and 20. The present invention may also be used to reduce the amount of data over local data links 12 but this is less critical as these connections normally operate at a higher bit rate than the connections to the remote terminals.

Figure 4:
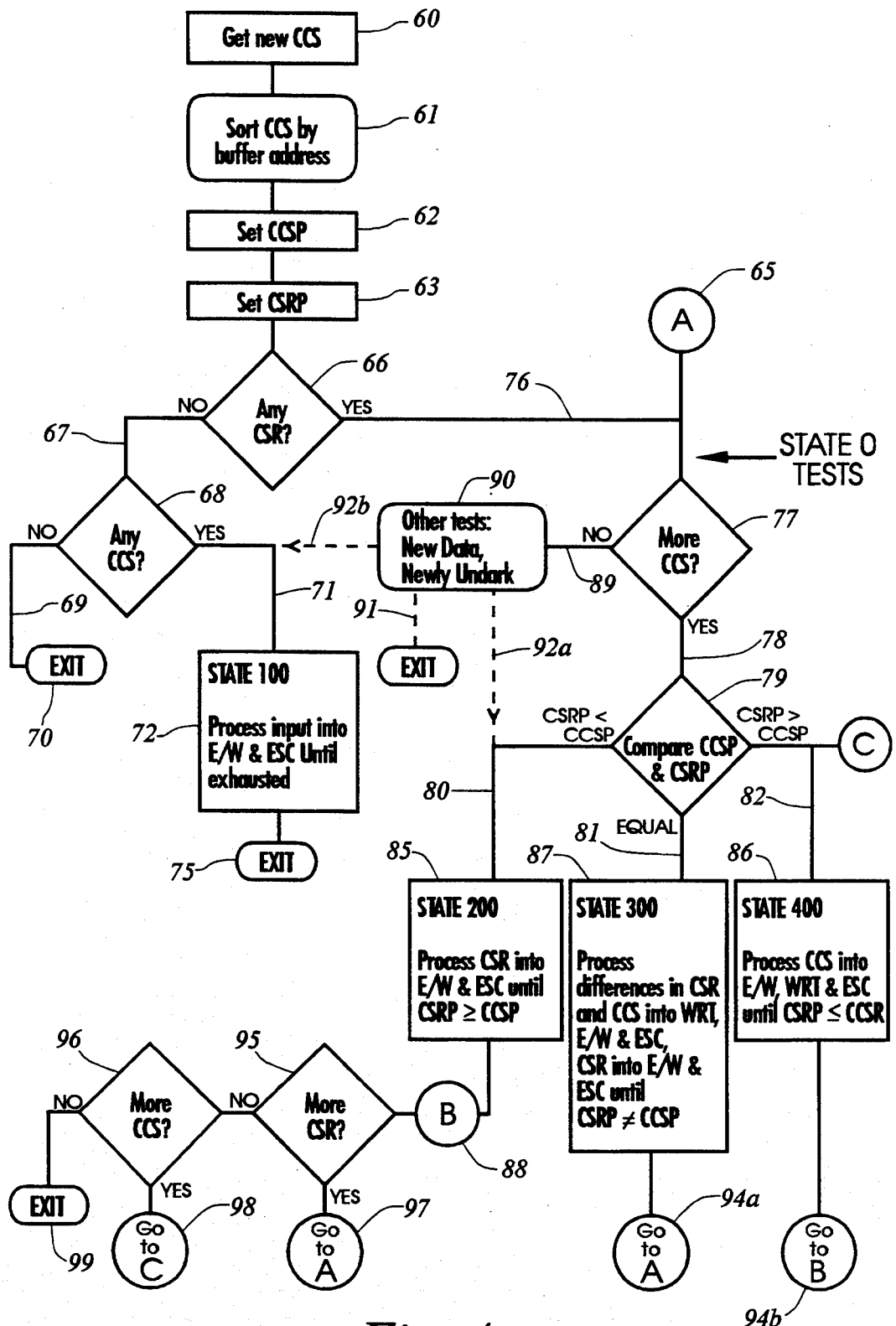
FIG. 4 is a flow chart of the overall program logic of the one pass compressor of the preferred embodiment.
Figure 5:
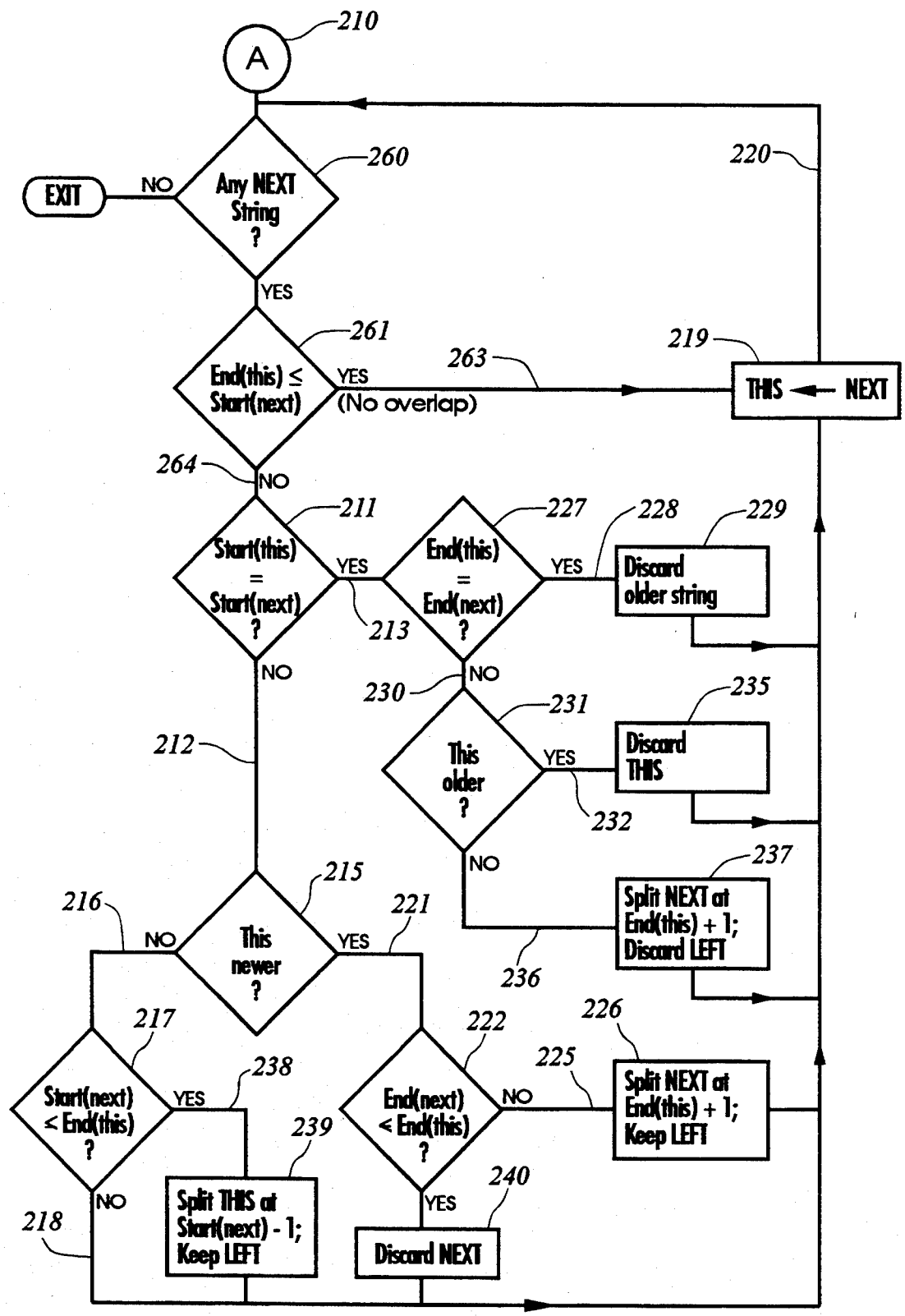
FIG. 5 is a flow chart showing the merge and split logic that follows sorting of string descriptors for the current command string, prior to analysis and merger with the current command string representation.

The method of the present invention is preferably executed by a program running concurrently as a task on host computer 10. The basic logic of the preferred embodiment is illustrated in FIGS. 3–5. First, some terminology will be addressed. As noted hereinabove, the video terminals with which the present invention was designed to be used have a concise defined command language. These commands control the writing of data into the screen buffer of the remote terminals 15 (FIG. 1).

Figure 2B:
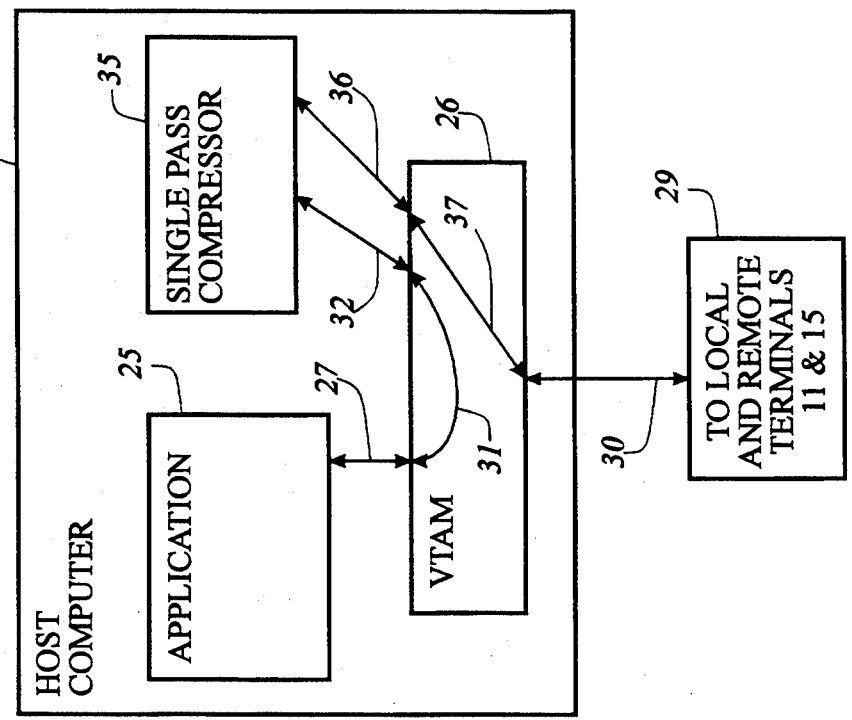
FIG. 2B is a block diagram showing the flow of data among an application, the VTAM software module, and a program embodying the present invention, all running on a host, and a terminal controller.
Figure 2A:
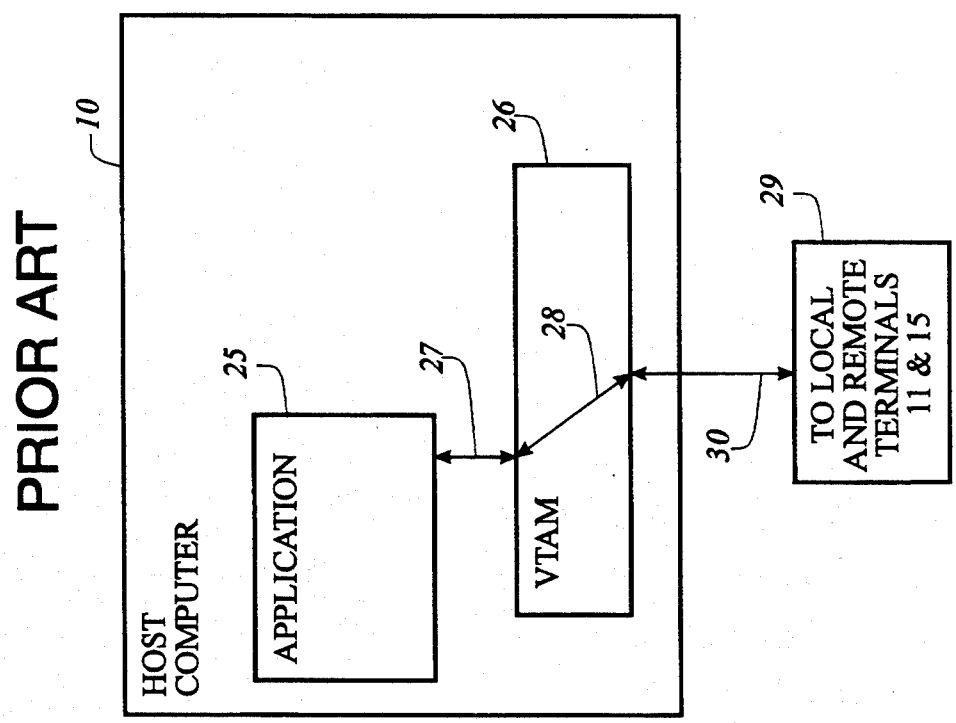
FIG. 2A is a block diagram showing the flow of data between an application and the VTAM software running on a host computer and a terminal controller.

FIGS. 2A and 2B show block representations of the flow of data through program modules of the environment in which the present invention is used. FIG. 2A shows prior art flow of data and information and FIG. 2B shows flow in a system embodying the method of the present invention. Turning first to FIG. 2A, host computer 10 is shown as running application program 25 that passes data to VTAM software module 26 over bidirectional link 27. VTAM 26 likewise passes data from the terminals back to the application over bidirectional link 27. Bidirectional link 28 represents the bidirectional path for input and output through the VTAM module that connects the application to a terminal controller 29 over bidirectional link 30. Thus, it should be understood that bidirectional link 27 represents a defined interface between the input to and output from an application program and the VTAM software module which accepts and provides such data according to the definition of the interface, and provides terminal specific commands over bidirectional link 30 to controller 29 according to information provided to the VTAM software module 26 about the physical nature of the devices connected to controller 29.

FIG. 2B shows a representation of a system employing the present invention. Data flowing between application 25 and VTAM module 26 is intercepted by bidirectional link 31 and passed over bidirectional link 32 to a program module 35 that embodies the method of the present invention. This module in turn passes data over bidirectional link 36 to a bidirectional link 37 through the VTAM which allows the VTAM to perform its other tasks relative to the data. Bidirectional link 37 is connected to bidirectional link 30 that connects input and output from controller 29 to the software modules.

Thus, the terminal output from the application flows through path 27, 31, and 32. The compressed output data flows from single pass compressor program module 35 over path 36, 37, and 30. Inbound data from the terminals flows over path 30, 37, and 36 to compressor 35. Because compressor 35 strips all MDTs set by the application, as explained in greater detail hereinbelow, the compressor module adds back to the data provided to the application over the path of links 32, 31, and 27, any data that the application is expecting because of application set MDTs. Thus, the single pass compressor maintains internal information about changes it has made to data coming from application 25 to link 30 and compensates for these changes when it passes data from link 30 back to application 25 so that the operation of single pass compressor 35 is transparent to application 25 running on host computer 10.

It should be noted that other prior art data compression methods are implemented by interposing modules between application 25 and VTAM module 26. However, the inventor of the present invention believes this is the only single pass compressor and believes it is the most efficient method of providing a minimum string length data compressor, in terms of CPU overhead, in this environment.

Before proceeding with a detailed description of the implementation of the preferred embodiment, it will be explained in terms of a simplistic example that should be of assistance in understanding its operation and the terminology employed in this specification. FIGS. 3A through 3C show a simplified terminal screen that is having one field of data added to it as a result of output from an application. FIG. 3A shows a present command string representation 37 of the screen of FIG. 3B. A set of current command strings 38 are provided from the application in order to write the resultant screen shown in FIG. 3C. The output objects of the preferred embodiment are shown as write command string 39, erase/write command string 40, and the expected state command string 50. FIG. 3B shows three words displayed on a computer screen. While it shows alphabetic data, these may be thought of as suggesting fields for a data base program as might be used by a business extending credit.

In FIG. 3A the current command string representation of the screen of FIG. 3B is shown. This is indicated as two Start Field orders and three Set Buffer Address (SBA) orders. The first Start Field order sets all following display (until the next SF order) to have attribute normal. The normal attribute means the display area is unprotected for input and low intensity display. The second SF order sets the protected from operator input attribute, the non-display attribute, and the MDT bit is set on. The Set Buffer Address order sets a pointer in the controller to a particular address in the terminal's buffer and writes the data or order that follows the SBA command into the buffer commencing at the address pointed to by the SBA command. Those skilled in the art will recognize that the normal command format for SBA commands specifies a particular buffer address. However, in FIG. 3A the SBA commands are shown in a row-column format for the sake of allowing an easy understanding of the correspondence between the commands and the output represented in FIGS. 3B and 3C.

Command string representation 37 includes SBA commands indicated by brackets 41 for writing the first SF order and the word "COMPANY" beginning at row 1, column 1, and the word "ADDRESS" at row 2, column 2. A third SBA order, indicated by bracket 42, is for writing the word "PHONE" beginning at row 3, column 5. This output is represented in FIG. 3B. It should be understood that, at the moment represented by command string 37, this is a command string representation that indicates the entire history of what has been written to the screen since the last time the application completely erased the buffer.

The set of current commands is shown at 38 on FIG. 3A. This duplicates the commands to write the first SF order, the words "COMPANY" and "ADDRESS". Additionally, a command to write additional verbiage to the screen, indicated by bracket 45, is present. This indicates that the buffer address should be set to row 2, column 15 and the word "CREDIT" should be written.

Three output objects of the preferred embodiment are indicated at 39, 40, and 50. Output object 39 is the write command string (WRT), output object 40 is the erase/write command string (E/W), and output object 50 is the expected state command string (ESC) which will become the CSR for the next input or output operation. It should be noted that the set of current command strings is sorted into ascending buffer address order, keeping in mind that buffer addresses commence with the address corresponding to row 1, column 1 and increase going left to right across an entire row, then moving to the left hand end of the screen for the next row. The statement that the present invention sorts strings in buffer address order indicates that it sorts them according to the lowest buffer address that is impacted by the command. The details of the sort logic are described hereinbelow.

Viewing command string representation 37 and the set of current command strings 38 together, the operation of the analysis and merger of the present invention can be intuitively appreciated. The orders indicated by brackets 41 in the command string representation 37 are duplicated in the set of current commands 38. Therefore, each of these orders is brought into the erase/write command string and the ESC, as indicated by dashed lines 46a and 46b. The preferred embodiment detects that the command 45 in the set of current commands 38 precedes command 42 in the current command string representation and therefore, the former is brought into the erase/write command string first, as indicated by dashed line 47. Dashed line 48 indicates that the last command of the erase/write command string is command 42 from the current command string representation.

In creating the write command string output object, the present invention notes that the pair of commands indicated by brackets 41 are the first two commands of the set of current command strings simply duplicate commands already present in command string representation 37. Therefore, both of these are eliminated when creating the write command string 39. The preferred embodiment further detects that command 45 is writing new data to a particular portion of the screen buffer starting at row 2, column 15. Therefore, command 45 is the only one that appears in the write command string 39, as indicated by dashed line 49.

As noted hereinabove, after write command string 39 and erase/write command string 40 are created, the preferred embodiment compares the length of the two and transmits the shorter. In the present case, the write command string 39 is the shorter and it is transmitted to the terminal. Viewing the previous state of the screen shown on FIG. 3B, it will be appreciated that the write command string 39 will create the screen display shown in FIG. 3C.

It should further be appreciated that, if the erase/write command string had been sent, preceded by an erase/write command, the identical screen shown in FIG. 3C would be produced.

It should be also noted that the final SF and data in the CSR as shown by bracket 51 are present in neither the WRT nor the E/W command string because the DARK specification prevents the data from displaying and the protected attribute prohibits the terminal operator from modifying the field contents. This data must be reflected in the ESC so the present invention reflects this in the string indicated by bracket 52 in FIG. 3A. An input operation in which data was provided from the terminal back to the application would cause the compressor to insert the INTERNAL DATA along with data from the terminal in the data sent to the application running on the host because the MDT bit is set in the ESC.

Before proceeding to the detailed description, some of the terminology used in this application will be explained. First of all, the particular details of the commands, attribute, bytes, write, control characters, order and the like for the 3270 family of terminal devices made by International Business Machines of White Plains, N.Y. ("IBM") are well known to those skilled in the art. These are documented in a publication by IBM entitled "3270 Control Unit Reference Summary", IBM Document No. GX20-1878-6. The information contained in said publication is well known to those skilled in the art and said publication is hereby incorporated by reference exactly as if set forth herein.

The buffer control orders are particular bytes in the order code and have the following mnemonics associated therewith.

SF—START FIELD, an order to start a field at the current buffer address.

SBA—SET BUFFER ADDRESS, an order to set the pointer to a particular buffer address into which the data following the SBA order code will be written.

IC—INSERT CURSOR, an order to insert a cursor at a particular address.

PT—PROGRAM TAB, an order to tab the buffer pointer to the next unprotected field.

RA—REPEAT TO ADDRESS, an order to fill all addresses between the current location and a designated address in the order with the character that is an argument of the order.

SFE—START FIELD EXTENDED, same as START FIELD but includes extended attributes for terminals with color and other more sophisticated attribute characteristics.

EUA—ERASE UNPROTECTED TO ADDRESS, an order to erase all unprotected data from a current address to a specified address.

MF—MODIFY FIELD, an order to modify attributes and characteristics of a field.

SA—SET ATTRIBUTE, an order to set an attribute characteristic for following character data.

Attributes of screen locations are contained in attribute characters which are transmitted by the application and stored in the terminals buffer. There are several attributes which control the type of data to be displayed. The important attributes that must be dealt with by the present invention are whether the protected attribute flag bit is set and whether the modified data tag (MDT) is set. It should be noted that the first two bits of the attribute character are not used to determine the attributes of a field or buffer location. The preferred embodiment of the present invention takes advantage of this particular feature of the command language for 3270 type terminals, although it does not form an essential part of the underlying invention.

Several mnemonics have been adopted for use in this specification in order to clarify the disclosure and to make the drawing figures more readable. The following list gives the mnemonics used and their significance in this specification.

CSR—COMMAND STRING REPRESENTATION. The current representation, maintained by the program implementing the present invention in 3270 language format that represents the current contents of the buffer. This representation would write the entire state of the buffer, if sent to the terminal buffer after it had been cleared, which state would be expected by the application that has been run in conjunction with the preferred embodiment to generate the command string representation.

CCS—CURRENT COMMAND STRING. The incoming string of commands and orders to the terminal that is generated by the application program running on the host.

CSRP—COMMAND STRING REPRESENTATION POINTER. The pointer to a buffer address with a character or order that is currently being analyzed and merged with CCS by the preferred embodiment. It is the buffer address into which the currently processed character or order would be written if the CSR were transmitted to the buffer.

CCSP—CURRENT COMMAND STRING POINTER. A pointer to a particular buffer address for the data or order in the current command string that is currently being analyzed and merged with the CSR by the preferred embodiment. It points to the buffer address into which the data or order currently being processed would be written if the current command string were transmitted to the buffer.

ESC—EXPECTED STATE COMMANDS. One of the output objects of the preferred embodiment. A list of commands in ascending buffer address order that represents the new state of the buffer as a result of the merger of the current command string representation and the current command string. Upon completion of the merger, the expected state commands (ESC) will become the new command string representation (CSR).

E/W—ERASE/WRITE. The erase/write command string that is another output object of the preferred embodiment. It is a string of commands in 3270 command language that would write to the screen all of the data that is visible to the user of the terminal following an erase/write command.

WRT—WRITE COMMAND STRING. The third output object of the preferred embodiment, a string of commands in 3270 command language that would write aH necessary data to the screen to provide all necessary output visible to the terminal user using only a write command.

With that background, the preferred embodiment will now be described in detail.

FIG. 4 shows the overall logical structure of the preferred embodiment of the present invention. FIG. 4 shows operation of the preferred embodiment for creating the three output objects in response to receipt of a current command string from the application. It should be noted that the preferred embodiment also handles inbound data from the terminal and can modify and possibly expand same, depending on the current state of the command string representation, so that the application receives its expected data. Logic is used to create the expected state commands (ESC) from merger and analysis of the command string representation and information returned by the terminal is identical to that for updating the ESC by analysis and merger of the CSR with the CCS except the MDTs are set as appropriate and different output objects are created. In both cases, the expected state command output object is created and, upon completion of the analysis and merger, becomes the new command string representation.

Turning now to FIG. 4, the first step is shown at 60 where the current command string from the application running on the host is obtained. Referring for a moment to FIG. 2B, this output from the host comes via links 27, 31, and 32 into the code that is implementing the process of the preferred embodiment. The balance of the steps illustrated on FIG. 3 take place within the code segment 35 that implements the preferred embodiment.

Next, the CCS is sorted by buffer address at a routine indicated by step 61. This is described in detail hereinbelow in connection with FIG. 5. For the moment, it is sufficient to note that the output of the sort is a set of commands in 3270 command format in ascending buffer address order. As will become apparent from reading the balance of the disclosure, it is much more efficient to first sort the current command string and then analyze and merge it with the existing command string representation than to deal with the commands in unsorted order. One of the results of this approach is that all of the output objects are, of necessity, in ascending buffer address order, including the expected state commands that become the new command string representation. Thus, the preferred embodiment inherently maintains its command string representation of the expected buffer contents in ascending buffer address order.

At steps 62 and 63, the CCSP and the CSRP are set to the first buffer address that is affected by a command in the CCS and a command in the CSR, respectively. A reentry point A is shown at 65 and is the top of the outer loop of the analysis and merger logic that lies below it in FIG. 4. Thus, once reentry point 65 is reached, the program will operate to analyze and merge the CCS and CSR until all three output objects have been created and it exits to determine the shorter of two of the objects and transmit one onto the terminal buffer.

A plurality of test steps lead to four blocks labeled states 100, 200, 300, and 400. These are the four basic families of submachines in the state machine implementation of the preferred embodiment. The tests that determine which of these four state submachines will be entered are referred to as the state zero tests. The fundamental logic of the preferred embodiment may be appreciated from considering the following and viewing FIG. 4. At procedure 61, the incoming set of current command strings is sorted in ascending buffer address order. As noted above, the command string representation (CSR) is inherently maintained in ascending buffer address order as a result of sorting the CCS and the way that the analysis and merger routine works. The basic logic of the preferred embodiment is to provide the above described pointers to the next address that will be operated on by a CCS command and a CSR command, and to determine the following from these pointer values. The existence of more buffer addresses that are affected by the CSR or the CCS is determined by whether the pointer value is less than a predetermined maximum that lies outside the address range of the buffer. The routine that increments the pointers sets the pointers to this highest address when it discovers that it has no more commands in the respective one of the strings to process.

Once it is determined whether there are more addresses that are affected by the CCS and CCR, the values of the pointer are tested. If they are unequal, then the lesser value pointer points to the next buffer address that needs to be processed for purposes of creating the expected state command string (ESC) and the erase-/write string (E/W). Depending on whether the information being written to these objects comes from the command string representation (representing data that is already considered to be on the screen by the application) or whether it is new data from the CCS will determine whether or not that data appears in the write (WRT) output object.

If the pointer values are equal it means that the currently processed data in the CCS is writing over data that has already been written to by a previous command and, according to the CSR, is writing to a buffer address that the application considers to have already been written to by previous output. When this occurs, the present invention tests to see if the data at these locations from the CCS is different from that in the CSR for the same locations. If it is different, it is written to all output objects and if it is the same, it is written to the E/W and the ESC, but not the WRT.

Returning to FIG. 4, the implementation of this logic used in the preferred embodiment is described.

At step 66, the first test is to determine if the command string representation exists. As noted hereinabove, this is done by testing the value of the CSR pointer to see if it has been set to the maximum address beyond the highest valid buffer address. If the CSR is absent, NO branch 67 is taken to test 68 which tests the CCSP to see if there is any data in the current command string, CCS. If there is none, both strings are exhausted and NO branch 69 is taken to exit point 70. When the logic indicated in FIG. 4 is exited, the preferred embodiment tests the relative lengths of the WRT and the E/W and sends the shorter of the two to the terminal.

If the test at step 68 is true, YES branch 71 is taken to the state 100 state machine, indicated as 72 on FIG. 3. As lo stated therein, the state 100 state machine processes data from the current command string into the E/W and ESC output objects until the CCS is exhausted, after which it exits at point 75. Since the state 100 is only reached through branches 67 and 71 (except as noted below), there is no current command string representation to process and thus, it follows that the CCS commands being processed are commands to write to a previously blank screen buffer. Thus, the processing of this data writes it to only the E/W and ESC objects.

If step 66 tests affirmative, YES branch 76 is taken to step 77 which is logically identical to step 68. If test 77 is affirmative, YES branch 78 is taken to terinary test 79 that compares the values of the pointers. Note that if branch 78 is reached, the machine has determined that there is more of both the CSR and the CCS to be processed. In this case, the particular one of the submachine states to be entered depends on the relative values of the pointers. If the pointer for the command string representation is the lesser of the two, branch 80 is taken. If the two are equal, branch 81 is taken, and if the current command string representation pointer is greater, branch 82 is taken from step 79.

At this point, it is appropriate to look ahead to see an advantage of using the finite state machine implemented in the preferred embodiment. The correspondence between some of the steps shown in FIG. 4 and those shown in FIGS. 6 and 7 will become apparent when the reader finishes with this entire specification. However, at this point, it should be noted that the test at steps 68 and 77 in FIG. 4 exist in only one definition in the source program for the code that implements the preferred embodiment. The result of the test branches on conditions MORE or FINISHED. However, if the MORE result is obtained at step 68, the state machine continues knowing that there is more of the CCS available and that no CSR existed because it got to step 68 only by traveling through a state in the state machine that corresponds to test 66.

The same test and result from step 77 drives a finite state machine with MORE CCS and MORE CSR. Simply by being in step 77 and executing the same tests as was executed at step 68, processing is continued as effectively as if two tests had been performed. Additionally, the test is threaded into the state machine definition at the point it is needed. This obviates the overhead of calling a subroutine but allows easy examination and maintenance of the source language while providing efficient computer operation when the compiled code implementing the machine is run.

If the CSRP is less, it means that the next data to be processed is that contained in the current command string representation. Therefore, branch 80 is taken to state 200 machine 87. Thus, at state 200 CSR data is processed into the E/W and ESC output objects until the command string representation pointer CSRP catches up with or passes the current command string pointer CCSP. In other words, information from the current command string representation is written into the erase/write command output object and the expected state command string (which later becomes the new CSR) until the CCS is writing into the same locations as the CSR or a command in the CCS becomes the only command writing to the next buffer address.

In a similar vein, if the current command string pointer is the lesser of the two, the state 400 submachine 86 is entered that processes the CCS into all three output objects until the current command string pointer CCSP reaches or exceeds the command string representation pointer CSRP. Note that this always writes into all three output objects since by virtue of having reached state 400, the command being processed from the CCS is writing into new territory in the screen buffer.

If the two pointers are equal, and branch 81 is taken to state 300 submachine 87, the data being processed from the current command string is overwriting a buffer location that has previously been written to by the application. Therefore, the state 300 machine determines whether this data is different or the same as that which the application believes already exists in the buffer. It should again be noted that the state of what the application expects to be in the buffer is indicated by the command string representation. The state 300 machine continues this process until the pointers are no longer equal. As noted on FIG. 4, the state 300 machine can write into all three output objects. Naturally, when it detects that data from the CCS being processed at the CCSP location is identical to data from the CSR at the same location, this data is not written into the WRT output object since them is no need to rewrite the data to get the visual image on the screen to conform to the new expected state of the display. Each of the submachines is exited at one of points 88, or 94a or 94b. The state 300 submachine is exited at point 94a and loops back to point A at 65, to the test for more of the current command string at 77. State submachine 400 is exited at point 94b, which takes it to the state indicated by node B at 88. Thus, state submachines 200 and 400 logically exit to the same state. From here, tests for more of the command string representation or the current command string are conducted at 95 and 96. If either of these exists, control is looped back to point A, as shown at 97, or point C as shown at 98, respectively. If there is no more of either string, analysis and merger of this current command string has terminated and the state machine terminates operation at 99.

Lastly, what happens if NO branch 89 is taken from step 77 should be considered. This leads to a set of routines indicated at 90 as other tests for new data and newly undark data that have alternative exit points. Note that tests 90 are only reached when there is some information in the current command string representation CSR but the current command string CCS has been exhausted. If this is new data, i.e., the application has transmitted an erase command as part of the most recently processed CCS, then the balance of the CSR is obliterated and tests 90 are exited via branch 91 shown in phantom. If tests 90 determine that it is only existing data, but that it has been newly undarkened by an order in the most recently processed CCS, branch 92 is taken that processes data from the command string representation into the E/W and ESC output objects. This is because it is necessary to maintain the integrity of the previously darkened data from the CSR in the output objects.

The last branch shown from routines 90 is branch 92b that merges with branch 71 from step 68. It should be understood that, in a manner that will become apparent from the detailed description of the state machine hereinbelow, the machine sets the source of the processed data to the CSR rather than the CCS before it enters submachine 100 via this route. Branch 92b is taken when there is more of the command string representation to be processed and the current command string has been exhausted, and the orders in the most recently processed CCS have not changed the DARK attribute of the locations of the data that is being processed from the CCS. Therefore, remaining data from the CSR that has its visual characteristics unchanged, is processed into the E/W and ESC output objects by the state 100 submachine until it is is exhausted.

One other aspect of the operation of the preferred embodiment should be mentioned here. The significant advantage is speed and reduction in host overhead that is accomplished by the present invention has been described. The present invention also exhibits a slight improvement in compression ratio over some prior art machines designed to generate minimum length strings of data such as that shown in the Harper et al. patent. The preferred embodiment detects a condition when creating its WRT output object that notes when a changed data character is followed by one or two bytes of redundant data, that are in turn followed by additional changed bytes. Rather than slavishly create an SBA command each time a changed byte is encountered, and closing it when it finds redundant data, the preferred embodiment notes when a single SBA command that includes both the first changed byte, the few bytes of redundant data, and additional changed data will be shorter than two separate SBA commands followed by their data. It then generates the shorter one in the WRT output object.

Consider the following example. Assume the screen contains the characters 1 2 3 sp sp, where "sp" represent a space character, and write a command from the application sends instruction to change this portion of the screen so that it reads 1 A 3 4 5. Prior art compressors would generate two SBA commands, the first for the A change. This command would be terminated when the redundant "3" was encountered and a new SBA command would be generated for writing the "4 5" string. Since each SBA command takes three bytes, a total of nine bytes would be transmitted by prior art compressors.

The preferred embodiment of the present invention notes that there is only a single character separating the first new data byte and the second new data byte and generates an SBA command designating the address of the first changed byte that includes the redundant data and the two following new data bytes. Therefore, it generates an SBA command for writing "A 3 4 5" which takes up seven bytes, i.e., two less bytes than the prior art. It is the inventor's belief that this attention to an opportunity to achieve further compression explains why the present invention has been found to have slight improvements in compression ratio, on the order of five percent, over the prior art in addition to its dramatic reduction in processor overhead.

By similar logic, an SF order (two bytes) may be chosen to advance a single position when the terminal already contains that SF order (yielding a savings of one byte) but an SFE (eight bytes) that was already in the terminal buffer would be replaced by an SBA, saving five bytes.

The current embodiment also retains pointers to duplicated characters and the most recent non-null, or protected buffer modification. Thus, when the state machine directs the subroutine POSITION to be called for the WRT object, the shortest order of the five possibilities, or a combination thereof, is selected:

(1) SBA order
(2) use one or two existing characters
(3) use an existing SF order
(4) Erase Unprotected to Address
(5) Repeat to Address.

It is believed that the foregoing is sufficient to enable one skilled in the art to practice the method of the present invention. The balance of this disclosure is directed to a more detailed disclosure of the novel method of representing and implementing an algorithmic state machine that is embodied by the preferred embodiment, to provide a sufficient example so that the implementation may be understood, and to provide additional information about the best mode of practicing the current invention as is currently considered by the inventor of the present invention. To accomplish this, first details of the procedure represented by procedure 61 on FIG. 4 are described. Next, the state tables for the state zero tests and the state 100 state machine are provided together with state diagrams of same and an explanation of how these implement these portions of the preferred embodiment of the data compressor of the present invention.

Sort Logic

The physical hardware of the 3270 family of terminals has no restrictions as to the sequence in which screen orders and display data is presented. It is possible to write the entire screen contents in reverse order, although same is highly undesirable from a programming point of view. However, it is quite common to encounter applications that write data to terminal screens in an order other than ascending address sequence. This may result from factors such as the order in which it occurred to the programmer to include the information written to the screen, the order in which procedures or subroutines are called, each of which may write to the screen and how bug fixes or new features have been added to revisions of a program. Irrespective of how that is encountered, the first task of the preferred embodiment is to sort the incoming current command string into ascending buffer address order. The terminals always return data in buffer address order and therefore the son is not necessary when processing data traveling from the terminals to the application.

To avoid moving large amounts of data about during the sort process, the preferred embodiment creates relatively small descriptors of the information in the current command string and sorts these. In particular, the descriptor includes the following:
  a pointer to the next string segment (or zero indicating the end)
  character attribute at the string beginning
  pointer to the actual data in memory
  screen offset at the beginning of the string
  screen offset at the end of the string
  length of the string
  sequence number.

The sequence number is the number of the order in which the command was received from the application. This is to handle current command strings that, within the set of command strings, overwrite some of the data written by previous members of the set.

The CCS input is scanned and contiguous segments are described with the string descriptors having the above listed elements. Each time a segment is created, either due to the buffer address being non-contiguous or decreasing in value, the sequence number in the string descriptor is incremented. In this manner, if two portions of the data string place different characters in the same buffer location, the latter of the two to occur will have the higher sequence number, and the preferred embodiment can discard the other data that would have been written to that location had the entire CCS been transmitted to the terminal.

The string descriptors are sorted with a radix search by sequentially sorting on the following parameters of the string descriptor in the following order.
  sequence number
  screen offset at the end of string
  screen offset at the beginning of the string.

Therefore, the screen offset at the beginning has the effect of being the most significant value in the radix sort. As those skilled in the art will know, a radix sort is one which simply sequentially sorts the members of a set from the least significant element to the most significant element. When this is finished, the string descriptors will be in an ordered list in order of screen offset at the beginning of the string. Once this is accomplished, the routine illustrated in FIG. 5 for determining if there is any overlap in the strings, and discarding appropriate portions of same, is executed.

In FIG. 5, the code segment illustrated is entered at step 210, which is the top of a loop. If there is no following string detected at test 260, the routine has completed and exits. The test at step 261 determines if the two strings overlap by seeing if the end of the current string is less than the start of the next string. If not, branch 263 is taken to step 219 which retains the THIS segment in the set and replaces it with the NEXT set, after which it loops back along branch 220 to test 260. If an overlap occurs, branch 264 is taken and the older portion of the overlap is discarded by the merge logic shown on the balance of FIG. 5. At step 211, the starting buffer address for the current descriptor is tested to see if it is equal to the starting buffer address for the next string descriptor. If it is not, NO branch 212 is taken and if it is, YES branch 213 is taken. Considering the NO branch for a moment, it will be appreciated that, by operation of the sort that has previously been performed, the starting address for the current descriptor must be less than that for the next descriptor when this branch is taken. This is because the radix sort, with the starting address is the most significant element, cannot leave the descriptor list in a state in which a higher number start address precedes a lower number start address. Therefore, the next inquiry is whether the current descriptor is newer than the next following descriptor. This is tested at step 215. Note that the current descriptor is for a newer segment if it has a higher sequence number, meaning that it occurred later in the CCS. If the result of this test is negative, NO branch 216 is taken to step 217 that tests to see if the starting buffer address for the next descriptor overlaps any portion of the command represented by the current descriptor. If this test is negative, the current descriptor is for a segment older than the next segment and NO branch 218 is taken to step 219 at which the next descriptor is obtained, and the program loops back to point A at step 220. If there is no next descriptor at step 219, processing of the sorted list has been completed. After this, all the string descriptors are combined into one buffer containing all string segments in linked order of their respective string descriptors. When this is completed, the preferred embodiment moves to step 62 shown on FIG. 4.

From the description so far, it will be appreciated that if the current command string is a well ordered set of commands each of which writes to a unique portion of the screen buffer, the path described heretofore via branches 212, 216, and 218 to step 219 will be followed. This is because the starting addresses will never be equal and there will never be an overlap detected by step 217. In a similar vein, if the current command string consists of a set of commands that all write to unique addresses in the screen buffer, but they were issued by the application in an order other than ascending buffer address order, the results of the above described sort will be such that the path from step 210 through branch 212 will be followed to step 215. From here, for at least one member of the descriptor list, YES branch 221 will be taken from step 215 because at least one descriptor will describe a command that has lower starting and ending buffer addresses but a higher sequence number than its next member. However, so long as they write to unique portions of the screen, test 222 will test negative and NO branch 225 will be taken to step 226.

The split at step 226 splits the next string descriptor starting at a value for the end of the current descriptor plus one. When this occurs, the current descriptor is retained in the list, the left hand portion of the split next descriptor is retained in the list and will become the THIS descriptor the next time step 219 is performed, and the fight portion of the split is placed in the list at its appropriate location, based on the sort sequence. It should be noted that this can operate on a next descriptor that does not overwrite any of the previous descriptor in the list and therefore, the left hand portion will be kept and the fight hand portion will be a null descriptor that will be discarded at step 219. This is what happens when the current command set consists of a set of commands that all write to unique areas of the screen, but come from the host in other than ascending buffer address order. It should be noted that the split function described in the code represented by FIG. 5 at steps 226, 237, and 239 split the descriptor into two contiguous descriptors. References to the left and right results of the split refer, respectively, to the portions having lower buffer addresses and higher buffer addresses.

Step 222 tests whether the end address of the next descriptor in the list is less than or equal to the end address for the current descriptor. If it is not, the current descriptor should remain in the list unamended and the next descriptor is split as described above. If test 222 tests positive, this means that the next descriptor on the list describes an older command that is completely overlapped by the buffer space written to by the present, and newer, descriptor. When this occurs, the next descriptor is discarded at step 240.

Next consider what happens if the starting addresses for two string descriptors are equal. In this case, YES branch 213 is taken to test 227 that checks to see if the end point of the current descriptor and the next descriptor are equal. If they are, YES branch 228 is taken. Naturally, this means that the two descriptors simply describe coextensive strings and the descriptor for the older of the two, which will be the current one as a result of the sort, is discarded at step 229.

If the end points are not equal, NO branch 230 is taken from step 227 and it is then necessary to test the sequence numbers to see if the current descriptor represents a string that is older than the next one. This is accomplished by test 231. If the current descriptor represents an older string, YES branch 232 is taken to step 235 at which the descriptor for the current string is discarded. The program then moves to step 219 to obtain the next string descriptor. Note that once branch 232 is taken, it has been determined that the starting points of the strings represented by the descriptors are the same, the end points are different, but the current descriptor is the older. The fact that the two end points are different leads to the conclusion that the end point for the next following descriptor is larger than the end point for the current descriptor since buffer address end point is the next most significant element of the radix sort. This means that the next descriptor completely overlaps the current one and, since test 231 has indicated that the current one is older, it is appropriate to throw away the entire string for the current descriptor at step 235.

If step 231 tests negative, NO branch 236 is taken and the descriptor for the next string is split by step 237. As noted on FIG. 5, this split takes place at the current end point plus one and the left hand portion is discarded.

Again, relying on the result of the radix sort, it will be appreciated that if step 237 is reached, we have descriptors for two strings with the same starting address, the next descriptor has a larger end point address and the next descriptor is the older one. Therefore, the current string descriptor describes a string which overlaps a portion of the string of the next descriptor and the next descriptor represents an older command. Therefore, the overlapping portion for the older command, i.e., the string of the next descriptor, is thrown away and the command for the present descriptor is maintained. The overlapping portions will be the left hand portion that results in the split at step 237 and thus, step 237 indicates that the left hand portion is to be discarded. A new descriptor is created that has as its beginning point the end point of the present and newer command plus one, and the remaining portion to the right (i.e., higher buffer addresses) is maintained in a new descriptor that is placed in the list at the appropriate location, per the radix sort.

A numerical example for descriptors of overlapping strings may make the operation of the program logic illustrated in FIG. 5 more intuitively appealing. Consider two string descriptors having elements 5, 15, and 1, and 10, 20, and 2. This triplet represents, in order, starting buffer address, ending buffer address, and sequence number. Thus, the radix sort will leave these descriptors in the order in which they are stated above.

When the (5,15,1) descriptor is the current descriptor, step 260 will test positive because (10,20,2) follows. Step 261 determines that an overlap exists due to 15 being greater than 10. Step 211 will test negative because the starting addresses are different. This leads to test 215 which will also be negative since the current descriptor has a lower sequence number than the (10,20,2) descriptor. Therefore, NO branch 216 will be taken to step 217. Step 217 tests positive and therefore YES branch 238 is taken to step 239. Step 217 is positive because the next starting address, i.e., 10, is less than or equal to the end of the current segment, that is, 15.

Therefore, the current string is split at the value of the next starting address minus 1, i.e., 9. This leaves a descriptor for addresses 5 through 9 (5,9,1) in the list as the left hand portion that is kept, as indicated at step 239. The right hand portion of the split descriptor which will have elements (10,15,1) will become the new next descriptor. This will be discarded as is completely overlapped by a newer string, via a path traveling along branches 213, 230 and 232 on the next pass through the logic. That path will be taken any time there are identical beginning points with the string descriptors and the newer (i.e., higher sequence number) string has an end point that is greater than the end point for the current string.

Next consider two strings having descriptors (5,20,1) and (10,15,2). These will sort in this order. On the first pass through, with the (5,20,1) descriptor as the current one branch 212 will be reached and branch 216 will be taken since the current descriptor is the older of the two. Step 217 will test positive and the current descriptor will be split into two descriptors at step 239, namely (5,9,1) and (10,20,1). The first is kept.

It should be noted here that the split routine executed at step 239 takes the new right hand portion and inserts it into the linked list of descriptors at its appropriate place according to the sort rules. Since the new right hand descriptor that results from the split, i.e., (10,20,1) should follow the NEXT descriptor (10,15,2), according to the rules of the radix sort, the split routine inserts it in the list below what was the NEXT descriptor in the most recent pass. In this manner, the integrity of the logic of the program segment shown on FIG. 5 that is based on the assumption that the radix sort was properly performed is maintained.

On the next pass through the (10,15,2) descriptor will be the current segment and the (10,20,1) will be the next segment. For this pass, step 211 tests true and step 227 tests false. Step 231 tests false since the (10,15,2) descriptor is newer than the next one. Therefore, the (10,20,1) descriptor is split into (10,15,1) and (16,20,1) at step 237 and the left hand segment is discarded keeping the (16,20,1), which is the proper result.

MDTs, Protected Data and Screen Blanks

Before proceeding to the state machine description, there are several aspects of the preferred embodiment that need to be described in order to fully disclose what the inventor believes to be the best mode of the present invention. First, modified data tag bits in attribute bytes transmitted by the application are turned off by the preferred embodiment before the attributes are transmitted (if they are transmitted) to the terminal device. This prevents the terminal from consuming transmission capacity sending back data for unmodified fields over the link that connects the terminal and the host. The command string representation keeps track of the fact that the modified data tags have been set by the application and, when inbound data is received from the terminal, will construct strings locally that are transmitted to the application to conform to what the application expects. Thus, the preferred embodiment internally handles the transmission of the contents of unmodified fields back to the application as a result of MDTs set by the application.

Additionally, the preferred embodiment keeps track of the reset MDT bits flag of the write control characters transmitted by the application and takes appropriate action on the modified data tags it maintains in its CSR.

There are a few slight differences between native 3270 command language that could actually be transmitted to a terminal controller device and the commands that are maintained as part of the command string representation CSR. These differences are simple to modify into true native 3270 command language and indeed, the preferred embodiment includes a routine for doing so in order to allow the preferred embodiment to quickly recreate the display of one terminal on the screen of another.

As is known to those skilled in the art, in 3270 commands, the two highest order bits of the attribute bytes are not used to define part of the screen attribute. In the physical devices sold by International Business Machines, the value of these bits is dependent upon the value of the remaining six bits in the attribute byte. The preferred embodiment of the present invention uses these to indicate whether or not the attribute in the expected state command string (ESC) has actually been written to the screen buffer. This is accomplished in the following manner. Depending on whether the erase/write or write output is chosen (which is not known until after all three output objects have been created) the start field or start field extended orders may or may not be present in the actual screen buffer at the terminal. The preferred embodiment uses the two undefined bits for the purpose of indicating whether the attribute has been physically written to the buffer. The program maintains a variable that indicates whether the E/W object or the WRT object was the last one sent to the physical screen. The high order bit is set when the start field or start field extended order is not written to the E/W output object as a result of the analysis and merger. The next to the highest order bit is set if the SF or SFE order is not written to the WRT object as a result of the merger and analysis.

If, when processing the next CCS, data needs to be written to this field, the combination of the variable indicating which of the two output objects was last transmitted can be logically combined with these two bits of the attribute byte for this order to determine whether the order was actually transmitted to the screen buffer. If the last command was E/W and the highest order bit is set, the field is not on the screen. Likewise, if the next to highest bit is set and the last output object chosen was the WRT string, the field is also not on the screen.

Therefore, if data is being written to this field as a result of the currently processed CCS, this buffer order needs to be included in the string that is transmitted. Therefore, while it is not known on the current pass which of the two output objects (E/W or WRT) will be sent the two highest order bits of the attribute are used to store information that, together with the after the fact information on which one was sent is used to determine whether a needed start field or start field extended order has been previously sent to the buffer.

An example will serve to illustrate the operation of this feature. Consider the sequence of application outputs, outputs from the compressor to the screen and the new expected state command strings (ESC) shown in the following Table 1.

TABLE 1

| | | | | |
|---|---|---|---|---|
| PROT | data-a | PROT | data-b | Application output |
| PROT | data-a | | data-b | Output from compressor |

TABLE 1-continued

| | | | | |
|---|---|---|---|---|
| PROT | data-a | PROTX | data-b | New Expected State Command String (ESC) |
| UNPR | data-a | PROT | data-b | Application output |
| UNPR | | PROT | | Output from compressor |
| UNPR | data-a | PROT | data-b | New Expected State Command String (ESC) |
| PROT | data-a | PROT | data-b | Application output |
| PROT | | | | Output from compressor |
| PROT | data-a | PROT | data-b | New Expected State Command String (ESC) |

This illustrates orders for protecting and unprotecting two contiguous fields in a terminal buffer. The first output from the application is a protect order followed by Data-A and another protect order for a contiguous field followed by Data-B. The compressor of the preferred embodiment outputs the command that sends a protect order and then Data-A and Data-B in contiguous addresses since the single protect order protects both field spaces on the screen. The indication "PROTX" for the second field and the ECS indicates that one of the two high bits of the attribute character has been set on then the representation of this order in the ESC to indicate that it is logically present so far as the application is concerned, but has not actually been written to the terminal buffer.

The next group in Table 1 shows a command from the application to unprotect the first field followed by a repeat of the transmission of Data-A. It also repeats the protect order and Data-B transmission from its previous output. The output of the compressor notes that the data in the two fields is unchanged and therefore, outputs only the unprotect order and the protect order. Note that the protect order is necessary in the output from the compressor program because its command string representation notes that the protect order represented by PROTX in the CSR has not actually been transmitted. It must now be transmitted so that the unintended result of unprotecting both fields is not accomplished.

After this, the representation of the order in the second field has the high bits cleared to indicate that the protect order has actually been sent to the terminal buffer.

The third output from the application in Table 1 repeats that of the first. Compressor notes that now all it needs to do is send a protect order for the first field since the data is redundant and the order to protect Data-B and rewrite same is redundant of the current actual contents of the screen buffer. Again, the ECS after the third output has the high bits cleared to maintain the representation in the ECS (and thus, the CSR) that the protect order is actually in the terminal's buffer.

Blank Spaces on the Screen

In a manner similar to the way it keeps track of orders that may or may not be present in the terminal buffer, the preferred embodiment likewise keeps track of differences between what has actually been sent to the terminal buffer and what is was asked to send to the terminal buffer in its command string representation. Therefore, three characters have been created that are used in the command string representation which are not part of the character set used by the 3270 terminal devices. This is the other difference between native 3270 language commands and how commands are stored in the command string representation of the buffer contents.

In particular, the inventor of the present invention has defined three new characters for hexadecimal values that are not defined as characters in the 3270 character set, namely, hexadecimal values 01, 02, and 03. These characters, and their use are defined in the following Table 2.

TABLE 2

| Character in CSR | Pseudo-Character Name | On Screen after WRT | Application Expects |
|---|---|---|---|
| Hex (01) | Missing-Space | Null | Space |
| Hex (02) | Pseudo-Null | Space | Null |
| Hex (03) | Pseudo-Space | Space | Space |

Note that aH of this subject deals with areas of the screen that are blank to the user. These may correspond to buffer addresses that contain either spaces or nulls, but both of these appear as blanks to the screen viewer. However, those skilled in the art know that the 3270 terminal responds differently when, for example, inserting data into a field, depending on whether the addresses that generate blank portions of the field on the screen are filled with nulls or spaces. Thus, them are many situations in which proper operation of the application requires the application have knowledge of whether nulls or blanks are actually in certain fields of the buffer.

In Table 2, the column labeled "On Screen After WRT" indicates what characters are actually in the screen buffer that are represented by the pseudo-character in the CSR shown in the table. These characters are on the screen only as results of WRT objects being transmitted to the buffer. When the erase/write string is transmitted to the buffer, all pseudo-characters in the CSR correspond to nulls that are physically loaded into the screen buffer.

TABLE 3

| | | | | | | |
|---|---|---|---|---|---|---|
| PROT | sp | sp | sp | sp | sp | Application output |
| PROT | | | | | | Output from compressor - WRT |
| PROT | ms | ms | ms | ms | ms | New Expected State Command String (ESC) |
| UNPR | sp | sp | sp | sp | sp | Application output |
| UNPR | sp | sp | sp | sp | sp | Output from compressor - WRT |
| UNPR | sp | sp | sp | sp | sp | New Expected State Command String (ESC) |
| PROT | sp | sp | sp | sp | sp | Application output |
| PROT | | | | | | Output from compressor - WRT |
| PROT | ps | ps | ps | ps | ps | New Expected State Command String (ESC) |
| UNPR | sp | sp | sp | sp | sp | Application output |
| UNPR | | | | | | Output from compressor - WRT |
| UNPR | sp | sp | sp | sp | sp | New Expected State Command String (ESC) |

An example of these pseudo-characters is shown in Table 3, which represents a sequence of four writes to the screen. First, assume initial conditions of a screen buffer that has been reset to nulls. The first application output is an order to define a protected field and a transmission of five spaces. The output from the compressor simply transmits the protect order and does not transmit the spaces, as they are not needed in order to have the screen display conform to what the application expects the user to see. From the fact that there is nothing in the previous command string representation for the screen location, the program implementing the preferred embodiment knows that nulls are at these locations and writes to its ESC output object the protect order and five occurrences of the pseudo character hex (01), i.e., the missing-space character.

On the next screen write, the application indicates that the field should be unprotected and transmits five spaces. Since the CSR on this pass indicates that missing spaces are located in this field, it knows that nulls are actually in the screen buffer and the application expects spaces. Since response of the terminal to typing in the field, now that it is unprotected, can be different for nulls and spaces, the output from the preferred embodiment is both the unprotect order and a transmission of the spaces as data. The ESC output object, which will become the CSR on a subsequent pass, now indicates true spaces.

The next output from the application again protects the field and sends the five spaces. The single pass compressor of the present invention detects the existing spaces and thus, only sends the protect order as its output, as indicated in the third cluster on Table 3. The ESC output object now includes pseudo spaces that indicates, for further processing, that spaces were actually received from the output that were not transmitted to the screen buffer on the last write command.

On the last application output, an unprotect order is sent together with five spaces. The preferred embodiment detects the pseudo spaces in the CSR and knows that these correspond to real spaces in the screen buffer. Therefore, only the unprotect order is sent by the write command and the presence of an indication of true spaces on the screen is reestablished in the ESC output object.

This method of maintaining a record of the differences between what actually appears in a terminal screen buffer and what an application thinks it has written to the screen buffer is also used sending appropriate responses back to the application over the path of communication links 30, 37, 36, 32, 31, and 27 as shown in FIG. 2B. Recall that the method of the preferred embodiment strips all modified data tags set by an application and maintains a record of these in the command string representation. When the MDTs have been set by the application for a field that includes pseudo-characters, the preferred embodiment inserts the actual character from the right hand column shown in Table 2 when returning data to the application.

For example, assume that the first application output shown in Table 3 had been sent by the application to a particular field in a screen buffer and further assume that the modified data tag for that field had been set by the application. Upon the receipt of data back from the terminal indicating that one of the terminal interrupt keys had been depressed, the preferred embodiment would note the setting of the modified data tag in the attribute bit for that field, as represented in the command string representation maintained by the program. Noting that, in the example, five missing space characters appear in this field, the program implementing the preferred embodiment inserts five space characters and returns these to the application. Therefore, the modified data tags have never been physically transmitted to the terminal buffer. Likewise, the five spaces originally output by the application (first line, Table 3) were not transmitted outbound, and were not retransmitted inbound over the data link connecting the host and the terminal buffer under consideration.

Improved State Machine Representation and Implementation

The foregoing has been a disclosure of the method of the preferred embodiment of the present invention for implementing a single pass data compressor for use with a command driven terminal that effectively minimizes the amount of data that physically travels over the physical host-to-terminal link and does so with significantly reduced host CPU processing time as compared to the prior art. Additionally, the preferred embodiment's method of maintaining information about the difference between the data actually loaded in the buffer and what the application should expect to be loaded in the buffer, as well as how certain inbound data is expanded when provided back to the host, has also been disclosed.

This portion of the disclosure shows additional details of what the inventor believes to be the best mode of the data compression method invention described herein as well as disclosing an underlying more general invention of a novel method of representing and implementing an algorithmic state machine. The balance of this specification describes this particular implementation for two bodies of code previously described and shown in FIG. 4. From the disclosure of this particular implementation, similar implementations for the remaining blocks of code shown in FIG. 4 may be created by those skilled in the art.

In particular, the novel state machine implementation for what is indicated as the state 0 tests in FIG. 4 are shown as well as the implementation of the state 100 state submachine.

The method of representing and implementing a state machine described herein is as follows. It is preferable, although not necessary, to create a conventional state tree diagram such as those shown in FIGS. 6 and 7. Then, a state table such as those shown in Tables 4 and 5 is created. Consider for a moment the state diagram of FIG. 6 and its corresponding state table shown in the following Table 4.

TABLE 4

| State Table From State 000 | | | | | | | |
|---|---|---|---|---|---|---|---|
| STATE 000 | STATETAB | PROC001, | TEST | 003, | STATE002 | , STATE001 | , STATE001 |
| STATE 001 | STATETAB | PROC006, | TEST | 003, | STATE100 | , DONE | , DONE |
| STATE 002 | STATETAB | PROC000, | TEST | 003, | STATE004 | , STATE003 | , STATE003 |
| STATE 003 | STATETAB | 0000000, | TEST | 001, | 00000000 | , STATE005 | , STATE008 |
| STATE 004 | STATETAB | 0000000, | TEST | 000, | STATE006 | , STATE300 | , STATE400 |
| STATE 005 | STATETAB | PROC001, | TEST | 010, | STATE200 | , STATE100 | , STATE200 |
| STATE 006 | STATETAB | 0000000, | TEST | 001, | 00000000 | , STATE007 | , STATE009 |
| STATE 007 | STATETAB | PROC001, | 0000 | 000, | 00000000 | , STATE200 | , 00000000 |
| STATE 008 | STATETAB | PROC002, | 0000 | 000, | 00000000 | , DONE | , 00000000 |
| STATE 009 | STATETAB | PROC003, | 0000 | 000, | 00000000 | , STATE010 | , 00000000 |
| STATE 010 | STATETAB | PROC001, | TEST | 003, | STATE002 | , STATE011 | , STATE011 |
| STATE 011 | STATETAB | PROC000, | TEST | 003, | STATE012 | , DONE | , DONE |
| STATE 012 | STATETAB | PROC004, | 0000 | 000, | 00000000 | , STATE400 | , 00000000 |

TABLE 5

State Table From State 100

| STATE 100 | STATETAB | 0000000, | TEST | 002, | 00000000 | , STATE101 | , STATE104 |
|---|---|---|---|---|---|---|---|
| STATE 101 | STATETAB | 0000000, | TEST | 005, | 00000000 | , STATE102 | , STATE103 |
| STATE 102 | STATETAB | PROC100, | TEST | 100, | STATE101 | , DONE | , DONE |
| STATE 103 | STATETAB | PROC101, | TEST | 100, | STATE100 | , DONE | , DONE |
| STATE 104 | STATETAB | 0000000, | TEST | 006, | STATE105 | , STATE105 | , STATE107 |
| STATE 105 | STATETAB | 0000000, | TEST | 005, | STATE999 | , STATE106 | , STATE109 |
| STATE 106 | STATETAB | PROC102, | TEST | 100, | STATE105 | , DONE | , DONE |
| STATE 107 | STATETAB | 0000000, | TEST | 005, | 00000000 | , STATE108 | , STATE113 |
| STATE 108 | STATETAB | PROC105, | TEST | 100, | STATE107 | , DONE | , DONE |
| STATE 109 | STATETAB | 0000000, | TEST | 007, | STATE110 | , STATE111 | , STATE117 |
| STATE 110 | STATETAB | PROC103, | TEST | 100, | STATE105 | , DONE | , DONE |
| STATE 111 | STATETAB | 0000000, | TEST | 009, | STATE103 | , STATE112 | , STATE103 |
| STATE 112 | STATETAB | PROC104, | TEST | 100, | STATE105 | , DONE | , DONE |
| STATE 113 | STATETAB | 0000000, | TEST | 007, | STATE114 | , STATE115 | , STATE118 |
| STATE 114 | STATETAB | PROC103, | TEST | 100, | STATE107 | , STATE998 | , STATE998 |
| STATE 115 | STATETAB | 0000000, | TEST | 008, | STATE103 | , STATE116 | , STATE103 |
| STATE 116 | STATETAB | PROC104, | TEST | 100, | STATE107 | , DONE | , DONE |
| STATE 117 | STATETAB | 0000000, | TEST | 004, | STATE119 | , STATE120 | , STATE103 |
| STATE 118 | STATETAB | 0000000, | TEST | 004 | STATE121 | , STATE122 | , STATE103 |
| STATE 119 | STATETAB | PROC106, | TEST | 100, | STATE105 | , DONE | , DONE |
| STATE 120 | STATETAB | PROC107, | TEST | 100, | STATE105 | , DONE | , DONE |
| STATE 121 | STATETAB | PROC106, | TEST | 100, | STATE107 | , DONE | , DONE |
| STATE 122 | STATETAB | PROC108, | TEST | 100, | STATE107 | , DONE | , DONE |

The terminology used in the this description and the notation on the drawings will be described in connection with this figure and table. On FIG. 6, the states are represented by the numbered circular nodes. Circular terminating nodes with a left pointing arrowheads thereon represent branches to other states. Thus, they are used for a convenient notation of some state transitions. The path extending from each state node contains the name of a procedure and the name of a test. If one or the other is missing, it simply means that no procedure or test is required when the machine is in that particular state.

The procedure causes a particular thing to be done by the computer implementing the state machine and the test tests for certain conditions that determine the next state to which the machine moves. Therefore, in thinking of the conventional model of an algorithmic state machine, the results of the call of the particular procedure at any state, and the results of the test, may be thought of as the input to the state machine such that the next state is a function of the present state and the inputs, as is true for all algorithmic state machines. Unlike conventional state machines in which there can be a relatively large number of inputs, this state machine may be thought of as selecting only a very small set of inputs by its selection of the procedure and test that is performed at each state.

It should be noted that the use of a state variable implementation of the compressor of the preferred embodiment avoids a complicated system of flags and registers that would need to be used if more conventional programming techniques were employed. This is because there are a relatively large number of variables that describe the current condition of the one pass analysis and merger routine performed by the present invention. Consider that the program must keep track of two pointers, i.e., one for the current command string and one for the command string representation. Under many circumstances, it needs to know the type of order that opened a particular field that contains the data to which the pointer in the string representations is currently pointing. It needs to keep track of which of the output orders (WRT, E/W, and ESC) have commands open, i.e., are currently in the process of building a command. There are other variables that will need to be tracked by flags and registers in a more conventional setting. Using a state implementation, the present state subsumes the information that would otherwise require a complicated set of variables.

Figure 6:
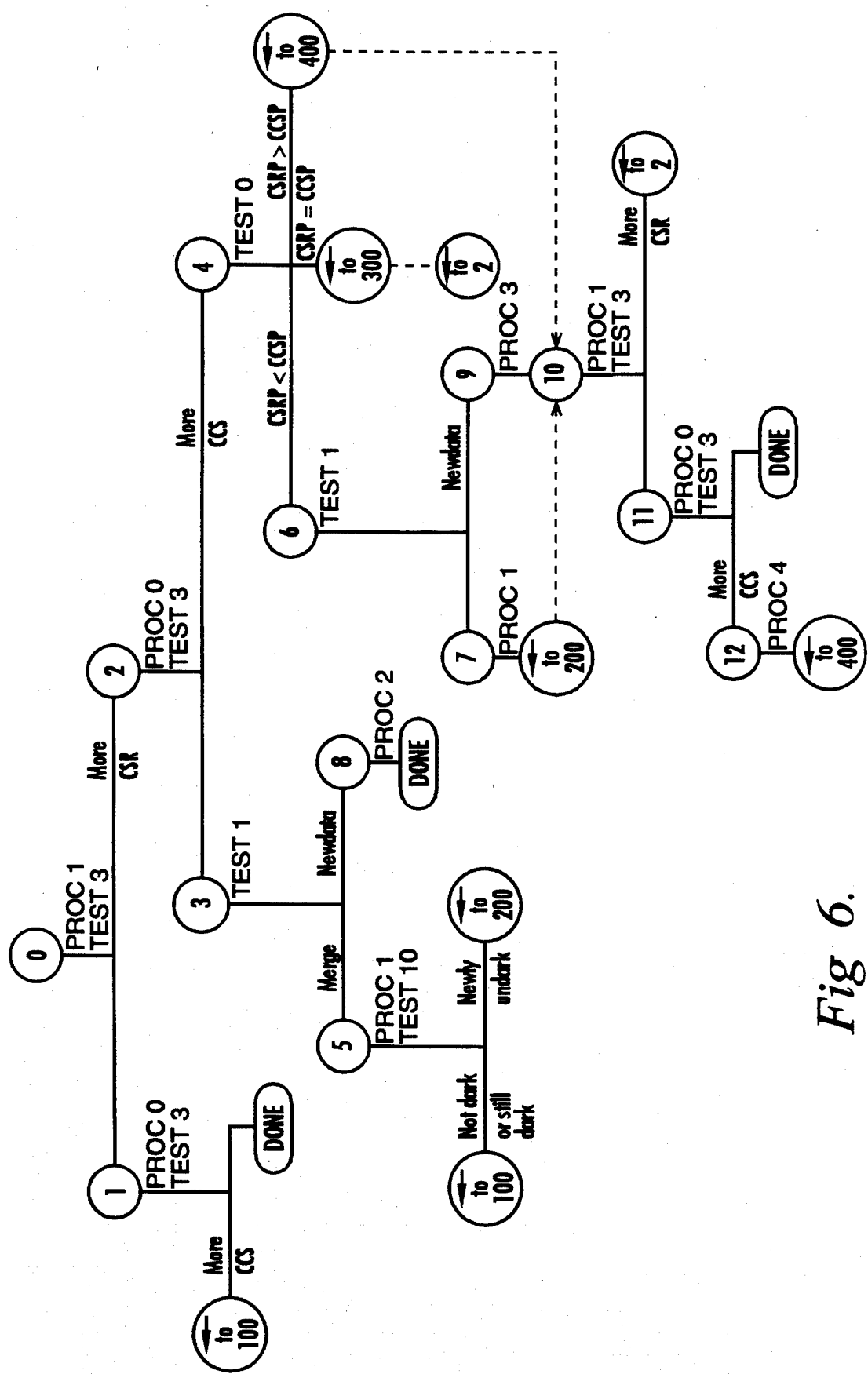
FIG. 6 is a state diagram for the lowest order states of the preferred implementation of the preferred embodiment of the present invention.

As may be seen from inspection of FIG. 6, the state machine implementation employed in the preferred embodiment is a terinary tree as, for example, shown by the three paths that may be taken from state 4 to state 6, state 300, or state 400. While most exit paths from states are binary in this particular implementation, the overall structure of the state machine is tienary and one of the possible outputs is either an impossible condition, or simply duplicates one of the other conditions, such as when the machine moves to a first new state if a particular variable is less than another, and to a second new state if the particular variable is greater than or equal to the other. This structure was chosen by the inventor because the conditional branch instructions for the processor upon which the preferred embodiment was implemented provided a terinary (three state) output indicative of whether one of the tested variables was less than, equal to, or greater than the other. However, the methodology described herein is equally applicable to construction of a binary tree or an N-ary tree where N is an integer greater than one. Furthermore, a terniary state diagram can be implemented with a processor that only has two output states for conditional branching instructions simply by executing two sequential conditional branch instructions.

On FIG. 6, dashed lines are shown to state 10 from the branching node to state 400 from state 4 and to state 200 from state 7. These indicate that after exit of the 400 and 200 submachines, respectively, the state machine returns to state 10, as indicated in FIG. 4. Similarly, a dashed line shows an ultimate branch to state 2 after the branch to the submachine for state 300 is taken from state 4.

The heart of the state machine representation and implementation method of this invention may be appreciated from viewing FIG. 6 in conjunction with Table 4, which is a representation of same. The point is that the state table of Table 4 is also the source code for implementing the machine. Table 4 is the actual source code employed in the implementation of the preferred embodiment for the state 0 submachine illustrated in FIG. 6, which forms a part of the best mode of implementing the method of data compression described hereinabove. The only modifications that have been made are that a space has been inserted between the word "state" and the state number on the labels on the left hand side of the table, and a space has similarly been inserted between the word "test" and the test numbers shown at each state in order to enhance readability of the table.

The machine operates as follows. In the representation and implementation shown in Table 4, each state variable in the left hand column is a valid label in the assembly language used to generate the object code that implements the state machine. Thus, the state numbers in the left hand column represent both the state variables shown on FIG. 6 and are labels to which the assembly language program can branch. At each labeled statement, the identical routine, referred to as "STATETAB" is called. STATETAB is a relatively short procedure that takes five arguments: a procedure identified by a label, a test procedure identified by a label, and three alternative branching labels that are either a state number label or all zeros. Thus, each branch to one of the state number labels always calls the same routine, i.e., STATETAB.

STATETAB first executes the procedure called out as its first argument and then executes the test called. When this is completed, the results of the test control branching to one of the three state labels that form the last three arguments of the STATETAB procedure. For entries in the state table for which there is a set of eight zeros in one of the state label arguments, it should be understood that this is a test condition that cannot occur. Thus, it is convenient to generate an error upon an attempt to branch to one of these. However, it is not expected that this should ever be encountered. Similarly, if a set of zeros appears as an argument in the procedure position or the test position, it indicates that no procedure or test, respectively, is to be executed while in this particular state. This is all that STATETAB does, repetitively call a procedure and test identified in its argument list, and then cause program control to branch to one of the three state labels that appear as the last three arguments in its argument list.

The procedures and test themselves take variable arguments that can be passed depending on the particular state in which the machine currently finds itself. For example, procedure 1 sets a source of commands that are being analyzed to the CCS and procedure 2 sets the source of commands to be analyzed to the CSR. Other procedures and tests test for certain conditions in the source input. The particular state in which the machine exists will determine whether the source is set to the CCS or the CSR. However, many procedures and tests that operate on information from the source or, test for conditions of the source, are generic and are equally applicable to testing for conditions in the current command string or the command string representation.

It should be noted from inspection of Tables 4 and 5 (below) that the procedures and tests are called multiple times at different states. Furthermore, these procedures and tests are used in the other state submachines, namely, the state 200 machine 85, the state 300 machine 87, and the state 400 machine 86 shown in FIG. 4.

The preferred embodiment of the present invention was implemented using system 370 assembler language, i.e., IBM S/370 Assembler Language, and those skilled in the art will recognize Tables 4 and 5 as (with the slight modification of the spaces described hereinabove) valid S/370 assembler statements.

In order to follow an example, the reader's attention is respectfully directed to Table 4, FIG. 6, and FIG. 4, all of which represent the state 0 tests performed. From this inspection in light of the following discussion, the general methodology will be appreciated. On FIG. 6, the machine starts in state 0. As shown on FIG. 6 at state 0, it executes procedure 1 (PROC1) and performs test 3. This is defined by the first two arguments of the STATETAB procedure at the STATE 000 label shown in Table 4. The state destination arguments of STATE 0 are states 1 and 2. It should be noted that there is a repetition of the state 1 label as two of the arguments in the STATE 0 entry in Table 4. Therefore, from reading the first line of Table 4, it can be determined that, depending on the results of test 3, the program should move to either STATE 1 or STATE 2.

Turning for a moment to FIG. 6, it will be seen that the path between STATE 0 and STATE 2 is labeled "MORE CSR", indicating that TEST 3 has determined that the command string representation has not yet been exhausted and therefore, the machine should move to state 2. If the command string has been exhausted, the machine moves from STATE 0 to STATE 1. Turning for a moment to FIG. 4, it should be understood that state 0 corresponds to conditional test 66 shown thereon. YES branch 76 is identical to the path over to STATE 2 shown on FIG. 6. Continuing with the example, STATE 1 on FIG. 6 corresponds to step 68 on FIG. 4. NO branch 69 from 54 goes to exit point 70 which is the DONE exit from STATE 1 shown on FIG. 6. Similarly, YES branch 67 on FIG. 4 takes the program to the STATE 100 submachine. This corresponds to the "MORE CCS" that branches to STATE 100 as shown in FIG. 6.

Likewise, STATE 4 corresponds to step 79 that has three possible branches therefrom. From inspection of the logical significance of branches 80 through 82 on FIG. 4 and the corresponding branches shown as exit paths from STATE 4 on FIG. 6, the correspondence will be appreciated.

It would belabor the point to provide a verbal description of each node and the paths therefrom on FIG. 6. They are described in state Table 4 and can be understood from the foregoing examples and the following description of the tests and the procedures in Tables 6 and 7.

TABLE 6

| Procedure No. | Function of the Procedure | Macro |
| --- | --- | --- |
| PROC000 | Set source of data to current command string | * |
| PROC001 | Set source to command string representation | * |
| PROC002 | Delete to end of screen in WRT string only | |
| PROC003 | Delete in WRT string only until address offset reaches input address offset | |
| PROC004 | Set CSR offset to maximum value [CSR exhausted] | * |
| PROC100 | Move characters to E/W and ECS | |
| PROC101 | Move order to E/W and ECS | |
| PROC102 | Move protected characters to E/W and ECS | |
| PROC103 | Update pointer of source from an SBA order | |
| PROC104 | Move order to ECS only | |
| PROC105 | Move characters to ECS only (protected dark) | * |
| PROC106 | Insert cursor in E/W | |

TABLE 6-continued

| Procedure No. | Function of the Procedure | Macro |
|---|---|---|
| PROC107 | Process protected repeat to address order | |
| PROC108 | Process protected, dark repeat to address order | |

TABLE 7

Tests used in FIGS. 6 and 7

| Test Number | Nature of Test |
|---|---|
| TEST000 | Test relative values of CCSP and CSRP (<, =, or >) |
| TEST001 | Tests for new data, i.e. CCS contains erase instruction |
| TEST002 | Test input string for protected or unprotected field |
| TEST003 | More input or exhausted |
| TEST004 | Test input order for IC, RA, or other |
| TEST005 | Test input for order or no order |
| TEST006 | Test input for dark or not dark |
| TEST007 | Test input order for SBA, SF, or other |
| TEST008 | Test input for same SF order or different SF order (dark) |
| TEST009 | Test input for same SF order or different SF order (undark) |
| TEST010 | Test input for newly dark data |
| TEST100 | More input or exhausted [processing order] |

Another important aspect of the preferred embodiment of the method of state machine representation implementation has to do with the significance of the macro column shown in Table 6. Each of the procedure labels that is the first argument of the STATETAB function shown in Tables 4 and 5 is a valid label to the assembler in use. The procedure names used in the state table are selected such that they may be either a valid label for a macro, i.e., a set of computer instructions to be inserted in place into the state table description, or a subroutine call. The particular choice of macro or subroutine is based on the length of the code segment that implements the procedure. The inventor of the present invention has selected shorter procedures to be expressed as macros and thus, when the state table is compiled into executable code, the inline code of a macro is directly compiled into instructions at the points at which that procedure is called. Longer procedures, particularly those called multiple times by various states, are encoded as subroutines. This provides for maximum efficiency and minimum size of the object code output from the assembler or compiler when the state table is compiled.

Therefore, the following should be noted about the representation and implementation method of this invention. Each of the procedures and tests that form the first two arguments of the state tab procedure are encoded. Their function is as described in Tables 6 and 7. STATETAB is a straightforward procedure that simply takes the arguments described herein and calls a procedure and test, as appropriate, each time it is run and furthermore causes branching to one of its three destination arguments. The branching steps are in the form of "GO TO [STATE LABEL]". Therefore, while much theory of modern structured programming thinking includes an almost dogmatic notion that GO TO statements should not be used in well disciplined programs, the use of the state table representation as both a state table listing and the source code itself leads to a easily maintainable, easy to understand representation of the program that is also the source code for the main body of the program. It should be noted that by constraining the movement of the machine among its states to those that can be controlled via calls of the STATETAB procedure, it is easy to insert additional states as needed without requiring renumbering of the states or trying to keep track of a multiplicity of condition variables.

Figure 7A:
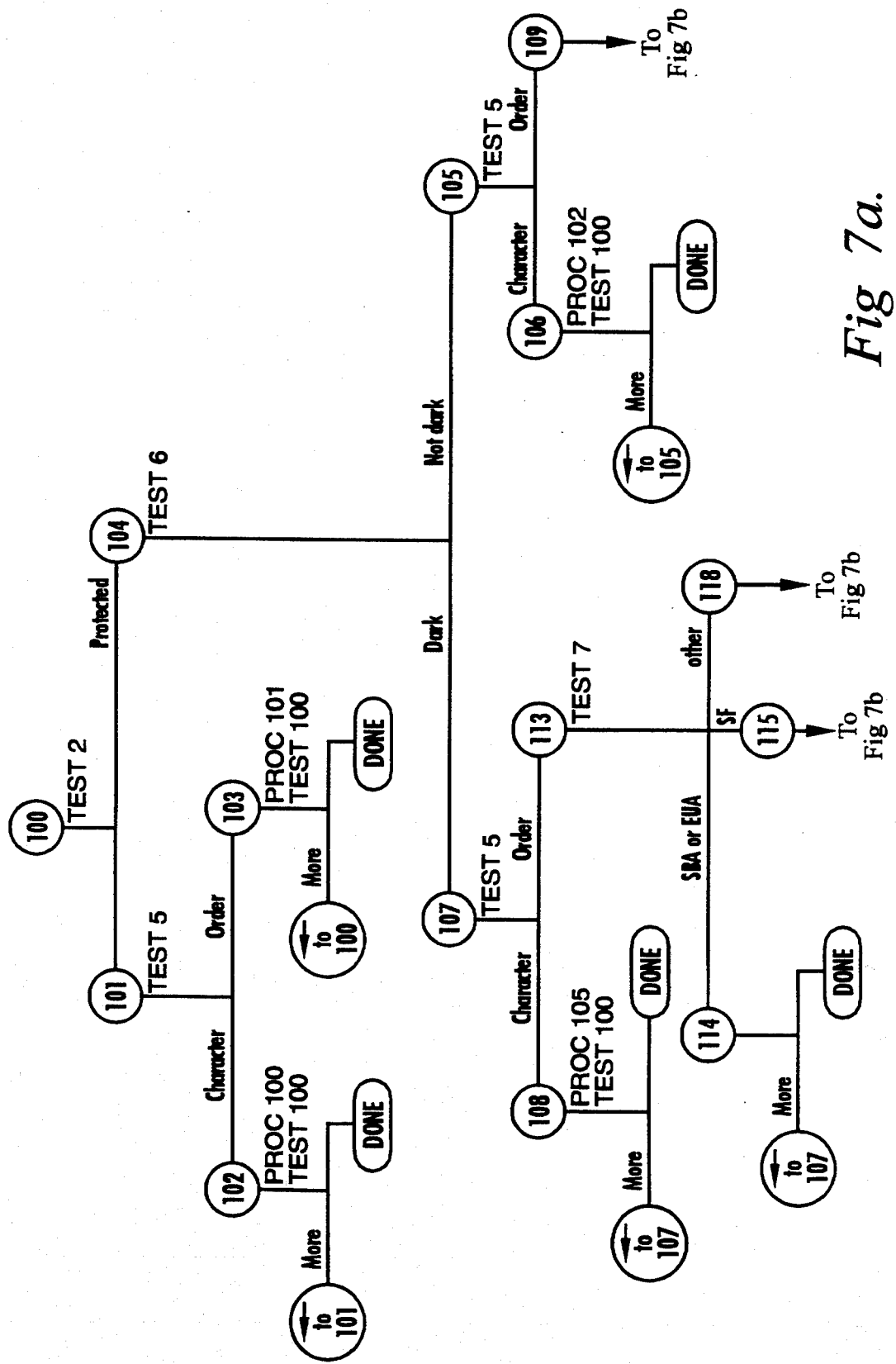
FIG. 7A and 7B illustrate state diagrams for the state 100 state submachine of the preferred embodiment.
Figure 7B:
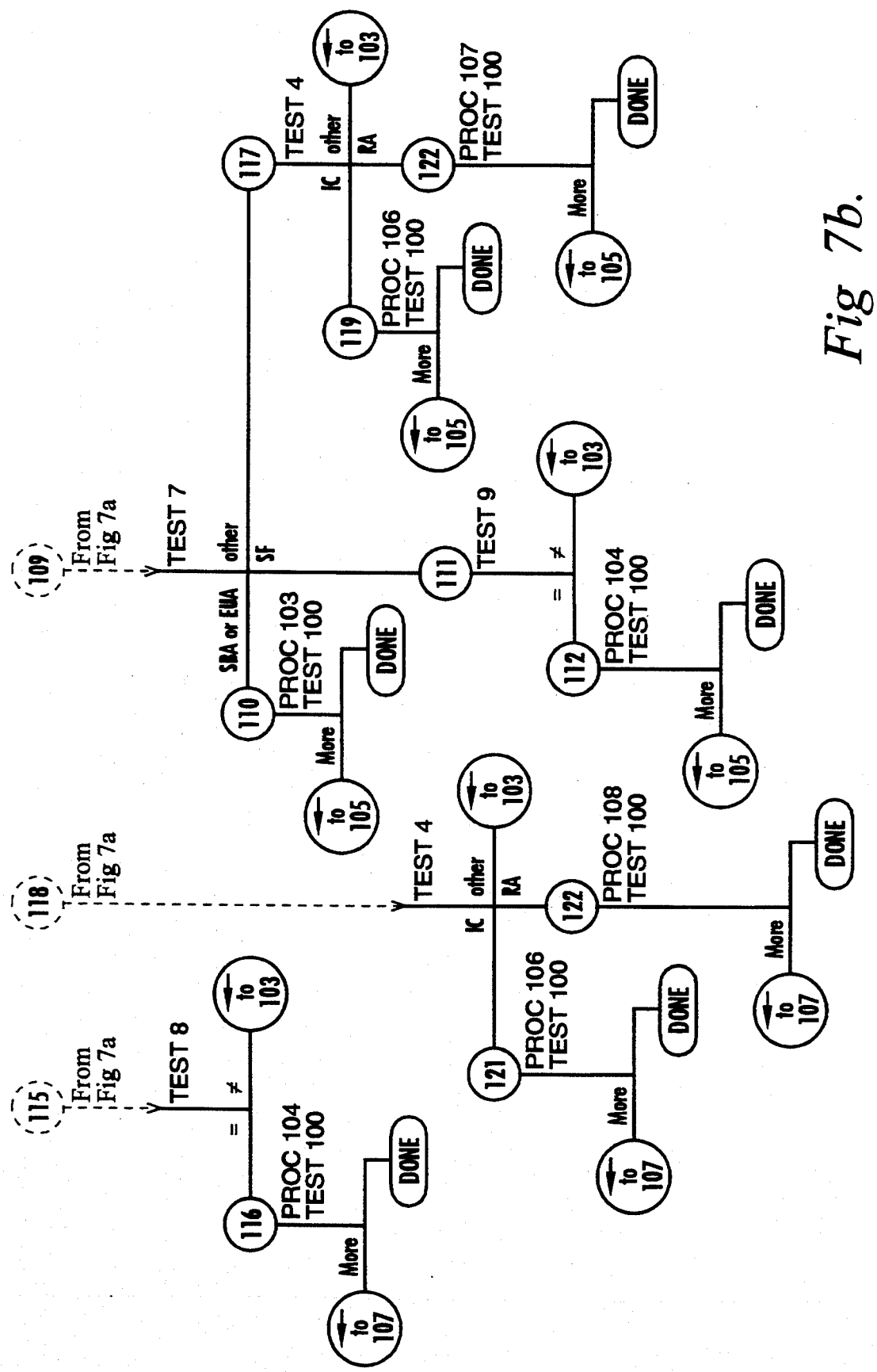

There are a couple of aspects of this constraint that can be appreciated, for example, in connection with a code on FIG. 7A or 7B. For an N-iary state table, (N being the number of branch to labels that are arguments of the STATETAB function) if a condition is encountered in which the machine needs to test for more than N possible outcomes, this can be accomplished by exiting from a first state to branches for N−1 of the outcomes with the other branch branching to state for which the other outcomes are possible. This may be repeated iteratively until all of the possibilities are tested.

For example, in the state 100 submachine shown in FIG. 7A and 7B, once it has been determined that an order has been encountered at state 113, the machine needs to identify whether it is one of a set of more than three possible orders. Therefore, the three branches from step 113 lead to state 114 which is taken if the order is either an SBA or an EUA, step 115 for a start field order, and step 118 for another type order. Turning for a moment to FIG. 7B, it can be seen that state 118 leads to three possible branches, i.e., to state 121 if it is an IC order, state 122 if it is an RA order, and a branch back to step 103 if it is another type of order. In this way, the machine advances from state 113 to an appropriate state based on detection of whether it has encountered one of five classes of orders. Therefore, the state machine representation implementation method of the present invention involves defining a state table in which the state labels are valid labels for the assembler or compiler that is used to generate executable code implementing the state machine. A single multi-argument function for processing each state is included that takes arguments of at least tests, and preferably procedures, and defines at least one output label for each state. Code for the procedures and tests is written, each of which is identified by a label that is used as an argument in the state table. The single multi-argument function redirects control to one of the destination state labels each time it is run.

It should be noted that the code for the STATETAB is generated only one time when the state table is assembled or compiled, but that the resultant computer instructions are executed millions of times per day during the running of a program embodying the present invention. Therefore, the STATETAB expansion of the present invention notices occurrences of the condition when two of the three possible state destinations are the same and tests the different one only and will go to the other if appropriate. Similarly, it detects the condition when one of the outcomes is the next state and does not execute a GO TO if that outcome is appropriate. In other words, it simply lets the program counter take the machine to the next state when the test indicates that it should go to the next state. Also, STATETAB detects when no test is conducted in a particular state and lets the machine simply fall through to the next state after the procedure when the first state is completed.

In the preferred form of the method procedure and test arguments with a single function are expressed as labels that can identify either macros or subroutines, subprograms or procedures. These are selected in a manner to generate the most compact and efficient code upon compilation or assembly.

From the foregoing, it will be appreciated that the process of the current invention meets the objects stated hereinabove and overcomes the drawbacks of the prior art previously described. Since the logic of the process only deals with buffer addresses into which data either has already been written or is being written by a new set of commands, it does not waste CPU time and memory testing and comparing values representative of the contents of empty addresses of the screen buffer at the terminal being serviced. By providing both a new expected state string, which may be used to newly write the buffer contents after an erase command, as well as a write command string that will write only the needed new data, it assures that a minimum length command string is all that is physically transmitted over the remote links to the video terminals being serviced. In view of the method disclosed in this specification, other implementations of the present invention will occur to those skilled in the art and therefore the scope of the present invention is to be limited only by the claims below and equivalents thereof.

I claim:

1. A method of compressing data transmitted to a terminal device, said terminal device being of the type having a characteristic predetermined plurality of commands and a command syntax defining a character string comprising one of said plurality of commands together with a data string as a command string, comprising the steps of:
   (a) receiving a first set of command strings from an application;
   (b) sorting said first set of command strings by buffer address locations contained in said set of command strings to provide a command string representation of the contents of a buffer at said terminal device;
   (c) transmitting said command string representation to said terminal device;
   (d) receiving a second set of command strings from said application;
   (e) sorting said second set of command strings by buffer address locations to provide a sorted second set of command strings;
   (f) sequentially analyzing and merging said sorted, second set of command strings and said command string representation to provide an expected state command string representation and a write command string representing data differences between said command string representation and said sorted second set of command strings;
   (g) storing said expected state command string representation as a replacement of said command string representation and transmitting said write command string to said terminal device; and
   (h) repeating steps (d) through (g) for subsequent sets of command strings received from said application.

2. A method of compressing data transmitted to a terminal device as recited in claim 1 wherein step (f) includes the steps of identifying each overwritten command string within said command string representation that affects a set of buffer locations completely overwritten by one or more command strings within said sorted second set of command strings and eliminates said each overwritten command string from said expected state command string representation.

3. A method of compressing data transmitted to a terminal device, said terminal device being of the type having a characteristic predetermined plurality of commands and a command syntax defining a character string comprising one of said plurality of commands together with a data string as a command string, comprising the steps of:
   (a) receiving a first set of command strings from an application;
   (b) sorting said first set of command strings by buffer address locations contained in said set of command strings to provide a command string representation of the contents of a buffer at said terminal device;
   (c) transmitting said command string representation to said terminal device;
   (d) receiving a second set of command strings from said application;
   (e) sorting said second set of command strings by buffer address locations to provide a sorted second set of command strings;
   (f) sequentially analyzing and merging said sorted second set of command strings and said command string representation to provide an expected state command string representation and a write command string representing data differences between said command string representation and said sorted second set of command strings;
   (g) storing said expected state command string representation as a replacement of said command string representation;
   (h) determining the shorter string of said command string representation and said write command string;
   (i) transmitting said shorter string to said terminal device; and
   (j) repeating steps (d) through (i) for subsequent sets of command strings received from said application.

4. A method of compressing data transmitted to a terminal device, said terminal device being of the type having a characteristic predetermined plurality of commands and a command syntax defining a character string comprising one of said plurality of commands together with a data string as a command string, comprising the steps of:
   (a) receiving a first set of command strings from an application;
   (b) sorting said first set of command strings by buffer address locations contained in said set of command strings to provide a command string representation of the contents of a buffer at said terminal device;
   (c) transmitting said command string representation to said terminal device;
   (d) receiving a second set of command strings from said application;
   (e) sorting said second set of command strings by buffer address locations to provide a sorted second set of command strings;
   (f) sequentially analyzing and merging said sorted second set of command strings and said command string representation to provide an erase/write command string, an expected state command string representation, and a write command string representing data differences between said command string representation and said sorted second set of command strings;
   (g) storing said expected state command string representation as a replacement of said command string representation
   (h) determining the shorter string of said erase/write command string and said write command string;

(i) transmitting said shorter string to said terminal device; and (j) repeating steps (d) through (i) for subsequent sets of command strings received from said application.

5. A method of compressing data transmitted to a terminal device, said terminal device being of the type having a characteristic predetermined plurality of commands and a command syntax defining a character string comprising one of said plurality of commands together with a data string as a command string, comprising the steps of:

(a) receiving a first set of command strings from an application;

(b) sorting said first set of command strings by buffer address locations contained in said set of command strings (c) sequentially analyzing said sorted first set of command strings to provide a first erase/write command string and a first expected state command string representation, (d) utilizing said first expected state command string representation as a command string representation of the contents of a buffer at said terminal device and transmitting said first erase/write command string to said terminal device;

(e) receiving a second set of command strings from said application;

(f) sorting said second set of command strings by buffer address locations to provide a sorted second set of command strings;

(g) sequentially analyzing and merging said sorted second set of command strings and said command string representation to provide an erase/write command string, an expected state command string representation, and a write command string representing data differences between said command string representation and said sorted second set of command strings;

(h) storing said expected state command string representation as a replacement of said command string representation (i) determining the shorter string of said erase/write command string and said write command string;

(j) transmitting said shorter string to said terminal device; and (k) repeating steps (e) through (j) for subsequent sets of command strings received frown said application.

6. A method of compressing data transmitted to a terminal device as recited in claim 4 wherein said step of sorting said second set of command strings by buffer address locations to provide a sorted second set of command strings includes the steps of:

sorting all orders and data sequences in said second set of command strings in monotonically ascending order of first buffer address affected;

parsing any of said orders and data sequences that overlap another of said orders and data sequences to provide sets of overlapping orders and data sequences and sets of non-overlapping orders and data sequences;

retaining said sets of non-overlapping orders and data sequences in said second set of command strings; and discarding members of said sets of overlapping orders and data sequences that have been overwritten by other orders and data sequences that occurred later in time in said said second set of command strings.

7. A method of compressing data transmitted to a terminal device as recited in claim 5 wherein said step of sorting said second set of command strings by buffer address locations to provide a sorted second set of command strings includes the steps of:

sorting all orders and data sequences in said second set of command strings in monotonically ascending order of first buffer address affected;

parsing any of said orders and data sequences that overlap another of said orders and data sequences to provide sets of overlapping orders and data sequences and sets of non-overlapping orders and data sequences;

retaining said sets of non-overlapping orders and data sequences in said second set of command strings; and discarding members of said sets of overlapping orders and data sequences that have been overwritten by other orders and data sequences that occurred later in time in said said second set of command strings.

8. A method of compressing data transmitted to a terminal device as recited in claim 1 wherein said step of sequentially analyzing and merging said sorted second set of command strings and said command string representation to provide an expected state command string representation, and a write command string representing data differences between said command string representation and said sorted second set of command strings includes the step of selecting a shortest one of a set consisting of an SBA order, an RA order, an EUA order, an SF order already present in said buffer at said terminal device, and K characters already present in said buffer at said terminal device, K being an integer between one and two when writing each element of said write command string.

9. A method of compressing data transmitted to a terminal device as recited in claim 4 wherein said step of sequentially analyzing and merging said sorted second set of command strings and said command string representation to provide an expected state command string representation, and a write command string representing data differences between said command string representation and said sorted second set of command strings includes the step of selecting a shortest one of a set consisting of an SBA order, an RA order, an EUA order, an SF order already present in said buffer at said terminal device, and K characters already present in said buffer at said terminal device, K being an integer between one and two when writing each element of said write command string.

10. A method of compressing data transmitted to a terminal device as recited in claim 5 wherein said step of sequentially analyzing and merging said sorted second set of command strings and said command string representation to provide an expected state command string representation, and a write command string representing data differences between said command string representation and said sorted second set of command strings includes the step of selecting a shortest one of a set consisting of an SBA order,
an RA order,
an EUA order,
an SF order already present in said buffer at said terminal device, and
K characters already present in said buffer at said terminal device,
K being an integer between one and two when writing each element of said write command string.

11. A method of compressing data transmitted to a terminal device, said terminal device being of the type having a characteristic predetermined plurality of commands and a command syntax defining a character string comprising one of said plurality of commands together with a data string as a command string, comprising the steps of:

(a) receiving a first set of command strings from an application;

(b) sorting said first set of command strings by buffer address locations contained in said set of command strings (c) sequentially analyzing said sorted first set of command strings to provide a first erase/write command string and a first expected state command string representation, (d) utilizing said first expected state command string representation as a command string representation of the contents of a buffer at said terminal device and transmitting said first erase/write command string to said terminal device;

(e) receiving a next set of command strings from said application;

(f) sorting said next set of command strings by buffer address locations to provide a sorted next set of command strings;

(g) establishing a CSRP pointer pointing to a lowest buffer address affected by said sorted next set of command strings (h) establishing a CSSP pointer pointing to a lowest buffer address affected by said command string representation (i) establishing at least three output objects including an erase/write command string output object, an expected state command string representation output object, and a write command string output object;

(j) traversing a plurality of predetermined states of a tri-state tree from a root state to a termination state in response to the relative values of said CSRP pointer and said CSSP pointer, the contents of said next set of command strings pointed to by said CSSP pointer and the contents of said sorted next set of command strings pointed to by said CSRP pointer by sequentially incrementing a lower one of said CSSP pointer and said CSRP pointer while comparing both of said contents and writing output to said three output objects in response thereto;

(k) storing said expected state command string representation output object as a replacement of said command string representation (l) determining the shorter string of said erase/write command string output object and said write command string output object;

(m) transmitting said shorter string to said tern-final device; and (n) repeating steps (e) through (m) for subsequent sets of command strings received from said application.

* * * * *